US012443150B2

(12) United States Patent
Iyer et al.

(10) Patent No.: US 12,443,150 B2
(45) Date of Patent: Oct. 14, 2025

(54) SYSTEMS AND METHODS FOR CONTROLLING DIGITAL CIRCUIT BREAKERS

(71) Applicant: nVent Services GmbH, Schaffhausen (CH)

(72) Inventors: Ganpathy Iyer, Sunnyvale, CA (US); Antonio Schettino, Schaffhausen (CH); Constantine V. Skidanenko, Schaffhausen (CH); Linda Kiss, San Mateo, CA (US); David Parman, San Ramon, CA (US); Paul Becker, San Carlos, CA (US); Dan Caouette, Katy, TX (US); Mohammad Kazemi, San Jose, CA (US)

(73) Assignee: Chemelex Europe GmbH, Schaffhausen (CH)

(*) Notice: Subject to any disclaimer, the term of this patent is extended or adjusted under 35 U.S.C. 154(b) by 1135 days.

(21) Appl. No.: 17/345,725

(22) Filed: Jun. 11, 2021

(65) Prior Publication Data

US 2021/0389733 A1 Dec. 16, 2021

Related U.S. Application Data

(60) Provisional application No. 63/038,036, filed on Jun. 11, 2020.

(51) Int. Cl.
*G05B 9/02* (2006.01)
*H02H 3/00* (2006.01)
(Continued)

(52) U.S. Cl.
CPC .............. *G05B 9/02* (2013.01); *H02H 3/006* (2013.01); *H02H 5/04* (2013.01); *H05B 3/58* (2013.01); *H02H 3/0935* (2013.01)

(58) Field of Classification Search
CPC . G05B 9/02; H02H 3/006; H02H 5/04; H02H 3/0935; H05B 3/58
See application file for complete search history.

(56) References Cited

U.S. PATENT DOCUMENTS 2,632,083 A 3/1953 Shaffer
4,245,318 A 1/1981 Eckart et al.
(Continued)

FOREIGN PATENT DOCUMENTS

CN 1870090 A 11/2006
CN 201138450 Y 10/2008
(Continued)

OTHER PUBLICATIONS

KR20040045543A—translation (Year: 2025).*
(Continued)

*Primary Examiner* — Elizabeth M Kerr
*Assistant Examiner* — Keith Brian Assante
(74) *Attorney, Agent, or Firm* — Quarles & Brady LLP

(57) ABSTRACT

A control system and methods for a digital circuit breaker are provided. The system comprises a digital circuit breaker, an electric trace heater electrically connected to the digital circuit breaker, a temperature sensor, and a controller device in communication with the digital circuit breaker and the electric trace heater. The controller device includes a processor in communication with the temperature sensor, and the processor is configured to receive a temperature value from the temperature sensor, construct a time-current curve for the digital circuit breaker based on the temperature value, and transmit data representative of the time-current curve to the digital circuit breaker.

11 Claims, 13 Drawing Sheets

(51) Int. Cl.
*H02H 3/093* (2006.01)
*H02H 5/04* (2006.01)
*H05B 3/58* (2006.01)

(56) References Cited

U.S. PATENT DOCUMENTS

| | | | |
|---|---|---|---|
| 4,752,853 A | 6/1988 | Matsko et al. | |
| 4,827,369 A | 5/1989 | Saletta et al. | |
| 4,937,757 A | 6/1990 | Dougherty | |
| 4,967,304 A | 10/1990 | Dougherty | |
| 5,710,408 A | 1/1998 | Jones | |
| 5,723,848 A | 3/1998 | Bilenko et al. | |
| 5,825,643 A | 10/1998 | Dvorak et al. | |
| 5,872,722 A | 2/1999 | Oravetz et al. | |
| 5,900,179 A | 5/1999 | Bilenko et al. | |
| 6,084,207 A | 7/2000 | Jones | |
| 6,104,352 A | 8/2000 | Jones | |
| 6,107,611 A | 8/2000 | Jones | |
| 6,172,647 B1 | 1/2001 | Jones | |
| 6,218,647 B1 * | 4/2001 | Jones | H01Q 3/005 219/544 |
| 6,735,496 B1 | 5/2004 | Roman | |
| 6,798,630 B1 | 9/2004 | Del Vecchio et al. | |
| 7,519,438 B2 | 4/2009 | Barbour et al. | |
| 8,014,115 B2 | 9/2011 | Vicente et al. | |
| 8,116,054 B2 | 2/2012 | Vicente et al. | |
| 8,270,136 B2 | 9/2012 | Vicente et al. | |
| 8,390,973 B2 | 3/2013 | Vicente et al. | |
| 8,618,813 B2 | 12/2013 | Ishii et al. | |
| 8,842,403 B2 | 9/2014 | Hummel et al. | |
| 9,006,617 B2 | 4/2015 | Mullen | |
| 9,065,269 B2 | 6/2015 | Jefferies | |
| 9,078,292 B1 * | 7/2015 | Mullen | H05B 1/023 |
| 9,651,184 B2 | 5/2017 | Crombie et al. | |
| 9,659,721 B1 | 5/2017 | Sastry et al. | |
| 10,230,232 B2 | 3/2019 | Freer et al. | |
| 10,276,321 B2 | 4/2019 | Kennedy et al. | |
| 10,541,530 B2 | 1/2020 | Kennedy et al. | |
| 10,630,069 B2 | 4/2020 | Kennedy et al. | |
| 10,784,061 B2 | 9/2020 | Kennedy et al. | |
| 10,804,692 B2 | 10/2020 | Kennedy et al. | |
| 2004/0196133 A1 * | 10/2004 | Kawanishi | H01H 85/06 337/159 |
| 2006/0230298 A1 * | 10/2006 | Bohlinger | H01H 37/002 713/300 |
| 2007/0055889 A1 | 3/2007 | Henneberry et al. | |
| 2007/0288100 A1 | 12/2007 | Cambell | |
| 2008/0158762 A1 | 7/2008 | Lenhart et al. | |
| 2008/0161979 A1 | 7/2008 | Papallo et al. | |
| 2011/0046809 A1 * | 2/2011 | Fickey | H02H 5/005 702/3 |
| 2014/0103938 A1 * | 4/2014 | Jones | H05B 3/565 324/511 |
| 2014/0278179 A1 | 9/2014 | Dougherty | |
| 2017/0214238 A1 | 7/2017 | Klijn et al. | |
| 2018/0277317 A1 | 9/2018 | Kennedy et al. | |
| 2018/0301294 A1 | 10/2018 | Kennedy et al. | |
| 2018/0366936 A1 * | 12/2018 | Kennedy | H02H 3/05 |
| 2019/0036324 A1 * | 1/2019 | Jimenez | H02H 1/0007 |
| 2019/0103742 A1 | 4/2019 | Kennedy et al. | |
| 2019/0157021 A1 | 5/2019 | Kennedy et al. | |
| 2019/0341213 A1 | 11/2019 | Kouroussis et al. | |
| 2020/0083699 A1 | 3/2020 | Kennedy et al. | |

FOREIGN PATENT DOCUMENTS

| | | |
|---|---|---|
| CN | 202131554 U | 2/2012 |
| CN | 101763125 B | 5/2013 |
| CN | 102296972 B | 10/2013 |
| CN | 203324854 U | 12/2013 |
| CN | 204083639 U | 1/2015 |
| CN | 205475457 U | 8/2016 |
| CN | 205864773 U | 1/2017 |
| CN | 108131714 A | 6/2018 |
| CN | 207994466 U | 10/2018 |
| CN | 208058242 U | 11/2018 |
| CN | 108980504 A | 12/2018 |
| CN | 209130367 U | 7/2019 |
| CN | 110597322 A | 12/2019 |
| CN | 111026196 A | 4/2020 |
| DE | 102011083825 A1 | 4/2013 |
| EP | 3145273 B1 | 8/2019 |
| KR | 20040045543 A * | 6/2004 |
| KR | 101372557 B1 | 3/2014 |
| KR | 101819048 B1 | 2/2017 |
| KR | 101934726 B1 | 1/2019 |
| RU | 2563007 C1 | 9/2015 |
| WO | 2007142394 A1 | 12/2007 |
| WO | 2012152986 A1 | 11/2015 |

OTHER PUBLICATIONS

Ali Vakili, P.E., Intelligent Molder Case Circuit Breakers—MCCB, Eaton Electrical, undated, 66 pages.
Chromalox Precision Heat and Control, IntelliTrace Instruction Manual, Oct. 2011, 33 pages.
Eaton Low-voltage circuit breakers, Power Defense circuit breakers, Product guide, Copyright Eaton 2019, Publication No. BR012016EN/Z22163 May 2019, 8 pages.
ABB reinvents the circuit breaker, media release, Apr. 1, 2019, 3 pages.
Jill Kiedaisch, How The World's First Digital Circuit Breaker Could Completely Change Our Powered World, dated My 22, 2019, article from Popular Mechanics, Copyright 2020 Hearst Magazine Media, Inc., 10 pages.
Atom Power Products Overview, Version 4.0, Copyright 2019 Atom Power, Inc. 20 pages.

* cited by examiner

SYSTEMS AND METHODS FOR CONTROLLING DIGITAL CIRCUIT BREAKERS

CROSS-REFERENCE TO RELATED APPLICATIONS

This application claims priority under 35 U.S.C. § 119 to U.S. Provisional Patent Application No. 63/038,036 filed on Jun. 11, 2020, the entire contents of which is incorporated herein by reference.

BACKGROUND

Generally, circuit breakers are used to prevent damage to electrical circuits by automatically opening a circuit (or switch), which is coined "tripping" the circuit breaker. Conventional circuit breakers are particularly problematic for some applications, including those involved in heating systems and those impacted by hazardous environments (e.g., atmospheres containing combustible gases, dusts, or fibers, or frigid temperatures, such as those in the oil, and gas industry), because of their moving parts and possibility of sparking. The structure and operation of conventional circuit breakers has not changed extensively until the recent introduction of digital circuit breakers (e.g., AS3P50, 50A Atom Switch™, Solid State Circuit Breaker Generation 2 or digital circuit breakers sold by Schneider Electric, such as the PowerPact™ H- and J-Frame with Micrologic™ breakers). While the digitization of the circuit breaker has greatly improved many of the drawbacks of conventional mechanically operated circuit breakers, current digital circuit breakers lack the desired functionalities (and components) necessary for particular electrical trace heating applications.

Thus, it would be desirable to have improved systems and methods for controlling digital circuit breakers.

SUMMARY OF THE DISCLOSURE

Systems and methods are provided for controlling digital circuit breakers. Some embodiments provide a control system for a digital circuit breaker electrically connected to an electric trace heater. The digital circuit breaker defines a time-current curve and the control system comprises a processor and memory accessible by the processor and storing program instruction. The processor executes the program instructions to cause the control system to modify the time-current curve of the digital circuit breaker based on the electric trace heater that is a load interfaced with the digital circuit breaker to generate a modified time-current curve, and obtain time-current information indicative of a current provided to the electric trace heater over a time period. The processor further executes the program instructions to cause the control system to compare the time-current information to the modified time-current curve to determine whether the time-current information exceeds the modified time-current curve and, responsive to a determination that the time-current information exceeds the modified time-current curve, cause the digital circuit breaker to disrupt current provided to the electric trace heater.

Some embodiments provide a control system for a digital circuit breaker. The system comprises a digital circuit breaker, an electric trace heater electrically connected to the digital circuit breaker, a temperature sensor, and a controller device in communication with the digital circuit breaker and the electric trace heater. The controller device includes a processor in communication with the temperature sensor, and the processor is configured to receive a temperature value from the temperature sensor, construct a time-current curve for the digital circuit breaker based on the temperature value, and transmit data representative of the time-current curve to the digital circuit breaker.

BRIEF DESCRIPTIONS OF THE DRAWINGS

DETAILED DESCRIPTION

Figure 1:
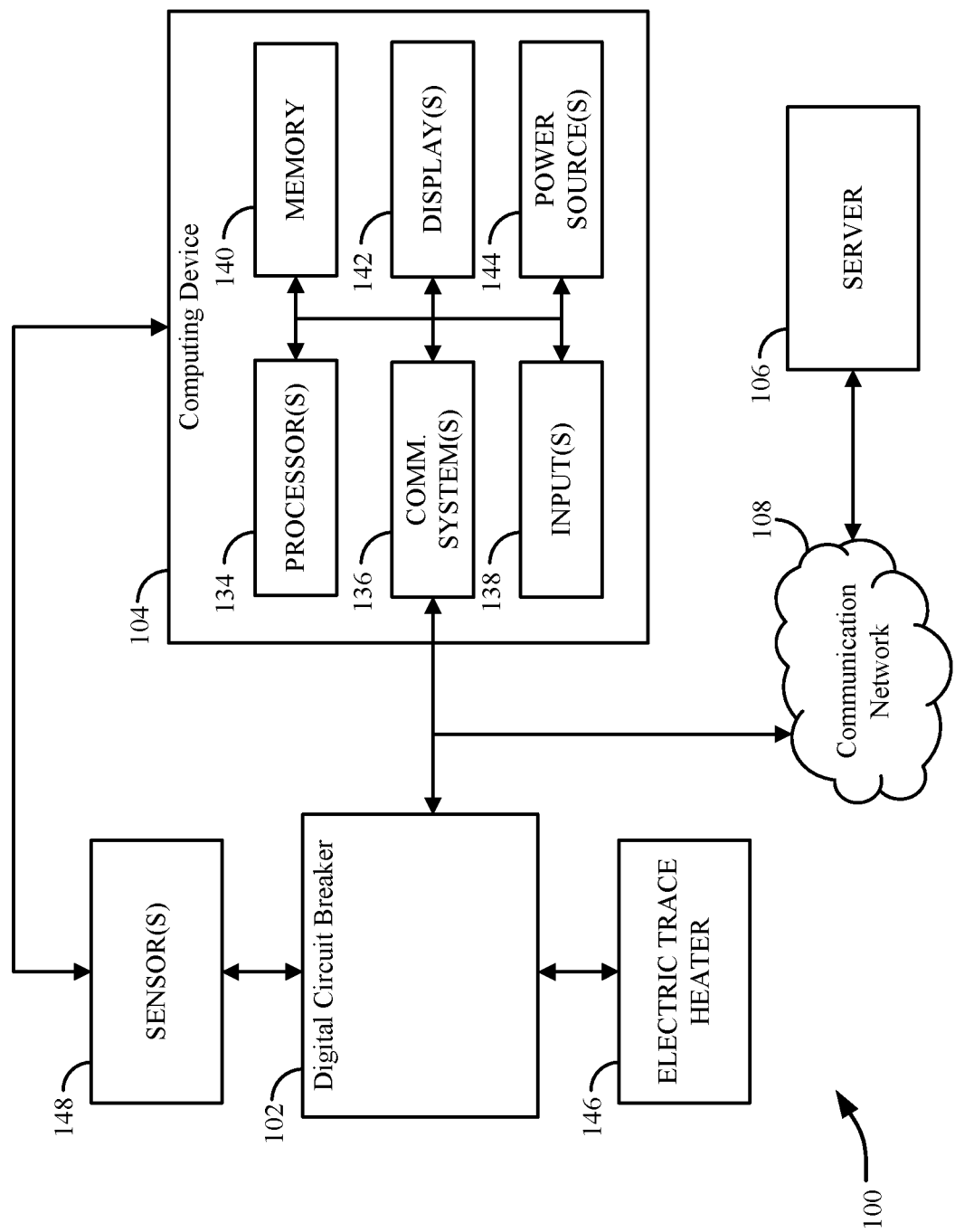
FIG. 1 shows a schematic illustration of a circuit breaker control system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that the use the phraseology and terminology used herein is for the purpose of description and should not be regarded as limiting. Furthermore, the use of "right," "left," "front," "back," "upper," "lower,"

"above," "below," "top," or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, phrases similar to "at least one of A, B, and C," "one or more of A, B, and C," etc., are meant to indicate A, or B, or C, or any combination of A, B, and/or C, including combinations with multiple or single instances of A, B, and/or C.

In some embodiments, aspects of the present disclosure, including computerized implementations of methods, can be implemented as a system, method, apparatus, or article of manufacture using standard programming or engineering techniques to produce software, firmware, hardware, or any combination thereof to control a processor device, a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to the invention, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

As used herein, the term, "controller" and "processor" and "computer" include any device capable of executing a computer program, or any device that includes logic gates configured to execute the described functionality. For example, this may include a processor, a microcontroller, a field-programmable gate array, a programmable logic controller, etc. As another example, these terms may include one or more processors and memories and/or one or more programmable hardware elements, such as any of types of processors, CPUs, microcontrollers, digital signal processors, or other devices capable of executing software instructions.

Digital circuit breakers, though a relatively new technology, may advantageously be deployed in certain applications to overcome the drawbacks of mechanical circuit breakers. However, current commercial offerings, as well as industry discussion of the technology, do not contemplate adaptations for an electric trace heating system. In particular, when an electric trace heater is electrically connected to a typically controlled digital circuit breaker, the digital circuit breaker cannot adjust its tripping conditions (e.g., time-current curves) to adapt to the electric trace heater and its corresponding load. This can be particularly undesirable for heating applications where the electric trace heater is prone to in-rush currents (e.g., due to relatively low temperatures, causing low resistances), which can cause undesirable tripping of the digital circuit breaker. Yet a standard tripping condition to accommodate high in-rush currents may still not be applicable for certain conditions in heat trace applications. For example, a high power relative to a low thermal mass to be heated can result in a fast in-rush current, whereas a low power relative to a high thermal mass to be heated can result in a slow in-rush current. Thus, a "one-size-fits-all" time-current curve, even if it takes into account an in-rush current, is not applicable to heat trace applications due to the different loads and conditions of such applications.

Additionally, currently available digital circuit breakers are not configured to monitor temperatures or ground fault leakage currents ("GFLCs"), and the inability to monitor such variables can lead to undesired consequences when used in non-traditional circuit breaker applications, such as with electric heat tracing. More specifically, the inability to determine or otherwise sense temperature (e.g., an ambient temperature, a temperature of heating loads that are electrically connected to the digital circuit breaker, a temperature of structures to be heated by the heating loads) can be problematic for trace heating applications. For example, as noted above, typical time-current curves of digital circuit breakers, even if modifiable, are not adapted to electric trace heating applications so that they properly operate in relatively cold environments. That is, because the typical time-current curves do not depend on temperature, the digital circuit breaker cannot adapt to the particular thermal load it is connected to, leading to improper operation, such as unnecessary trips.

With respect to GFLCs, in some regions, electrical codes require the use of GFLC detectors or sensors to be integrated within most electrical heating systems. However, because some digital circuit breakers lack GFLC monitoring, separate GFLC detectors must be implemented within the system to satisfy electrical codes, leading to additional equipment requirements and costs.

Furthermore, current digital circuit breakers cannot determine or provide health information for the heating loads electrically connected thereto. For example, a typical digital circuit breaker cannot determine if the electric trace heater needs to be replaced (e.g., from degradation over time).

Some embodiments provide systems and methods for controlling digital circuit breakers that provide improvements over conventionally controlled digital circuit breakers in electric trace heating applications. For example, some systems and methods for controlling digital circuit breakers, according to some embodiments, allow digital circuit breakers to adjust their operational conditions based on electric trace heaters that are (or are to be) electrically connected to the digital circuit breaker. For example, one or more time-current curves can be uploaded to or received by the digital circuit breaker, and can be related to various parameters of the electric trace heater such as, the resistivity of the electric trace heater, the temperature coefficient of the electric trace heater, the cross-sectional area of the electric trace heater, the length of the electric trace heater, the impedance of the electric trace heater, the resistance of the electric trace heater, or other variables. This can allow for customizing operation of the digital circuit breaker specific to the electric trace heaters, and can prevent unwanted tripping of the digital circuit breaker during operation.

In some embodiments, a digital circuit breaker control system and methods allow for the monitoring of one or more temperatures, for example, via one or more temperature sensors. The temperature sensor can be configured to measure or obtain an ambient temperature, a temperature of a component heated by the electric trace heater electrically connected to the digital circuit breaker, a temperature of the electric trace heater, or another temperature related to the electric trace heater and/or its environment. In this way, the operational conditions of the digital circuit breaker can be adjusted based on the sensed temperature. For example, the digital circuit breaker can update or otherwise modify operational parameters, such as a time-current curve, based on a sensed temperature, such that the digital circuit breaker operates according to the modified time-current curve.

In some embodiments, a digital circuit breaker control system and associated methods monitor ground fault leakage currents for heating applications. For example, a controller in communication with a digital circuit breaker can include a ground fault leakage current sensor that measures (or detects) a ground fault leakage current from the electric trace heater electrically connected to the digital circuit breaker, or a conductor internal (or external) to the digital circuit breaker that provides the power to the electric trace heater. The ground fault leakage current sensor can provide information (e.g., a voltage, current, magnitude over a time period, or an on/off signal, etc.) indicative of a GFLC event. In this way, the digital circuit breaker can disrupt current flow to the electric trace heater, based on the ground fault leakage current information (e.g., a value) exceeding a threshold.

In some embodiments, a digital circuit breaker control system and associated methods can determine a health score for an electric trace heater electrically connected to the digital circuit breaker based on one or more sensed parameters over time. The health score can provide an indication that the electric trace heater should be serviced and/or replaced, or a time until the electric trace heater should be serviced or replaced. For example, the health score can be updated (and transmitted to a computing device), and compared to a threshold. In some cases, an alert (e.g., an alarm, a notification, etc.) can be relayed to the computing device, or displayed on a digital circuit breaker, based on the health score exceeding a threshold health score.

In any of the above embodiments, and as further described in more detail below, the digital circuit breaker control system can include a separate digital circuit breaker and computing device adapted for use with an electric trace heating system, can be integrated into an electric trace heating controller device as a circuit breaker feature of the trace heating control system, or can incorporate the electric trace heating controller device to operate as a hybrid digital circuit breaker-electric trace heating control system.

FIG. 1 illustrates a circuit breaker control system 100 according to some embodiments. The circuit breaker control system 100 includes a digital circuit breaker 102, a computing device 104, and a server 106, all of which can communicate with each other, directly or via a communication network 108. The circuit breaker control system 100 can also include one or more electric trace heaters 146 and one or more sensor 148. In some embodiments, the computing device 104 can include a processor 134, communication systems 136, inputs 138, memory 140, displays 142, power sources 144. For example, the computing device 104 can be a computer, a laptop, a smartphone, etc.

As shown in FIG. 1, the electric trace heater 146 that can be electrically connected to (and disconnected from) the digital circuit breaker 102. That is, when the digital circuit breaker 102 is closed (e.g., the digital circuit breaker 102 has not tripped), power flows from a power source (not shown), through the digital circuit breaker 102, and to the electric trace heater 146 thereby allowing the electric trace heater 146 to heat components that are coupled to the electric trace heater 146. When the digital circuit breaker 102 has opened (e.g., tripped), the electric trace heater 146 is electrically disconnected so that power is disrupted from flowing to the electric trace heater 146. In some applications, the electric trace heater 146 can be a heat tracing cable, a self-regulating heating cable, or other trace heating system.

In some embodiments, the digital circuit breaker 102 can embody different forms. For example, the digital circuit breaker 102 can be a solid state circuit breaker (e.g., having no mechanical parts), can be an intelligent circuit breaker (e.g., having mechanical components to provide isolation) that also has processors, memory, sensors, etc., can be a hybrid digital circuit breaker having both components from the solid state circuit breakers and intelligent circuit breakers, such as having a solid state switch that disrupts power to the load, and mechanical components to also provide electrical isolation to also disrupt power to the load. As such, the digital circuit breaker 102 can include a processor, a display, input(s), power electronics, buttons, terminals, memory, communication systems, sensors, power sources, switches, and conductors, such as is provided in digital circuit breakers currently available (e.g., AS3P50, 50A Atom Switch™, Solid State Circuit Breaker Generation 2, available at www.atompower.com, PowerPact™ H- and J-Frame with Micrologic™ breakers sold by Schneider Electric).

Figure 2:
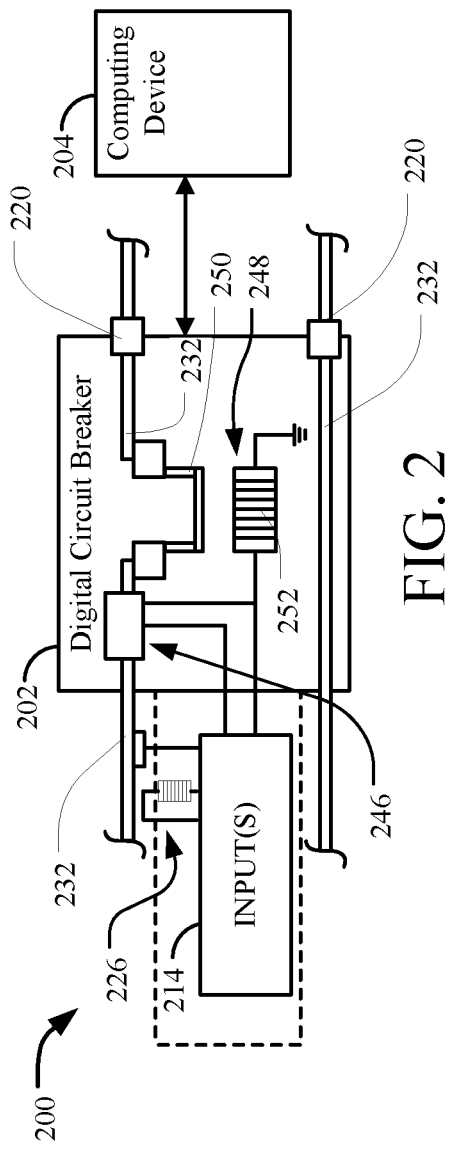
FIG. 2 shows a schematic illustration of a circuit breaker control system with a digital circuit breaker in a closed position.
Figure 3:
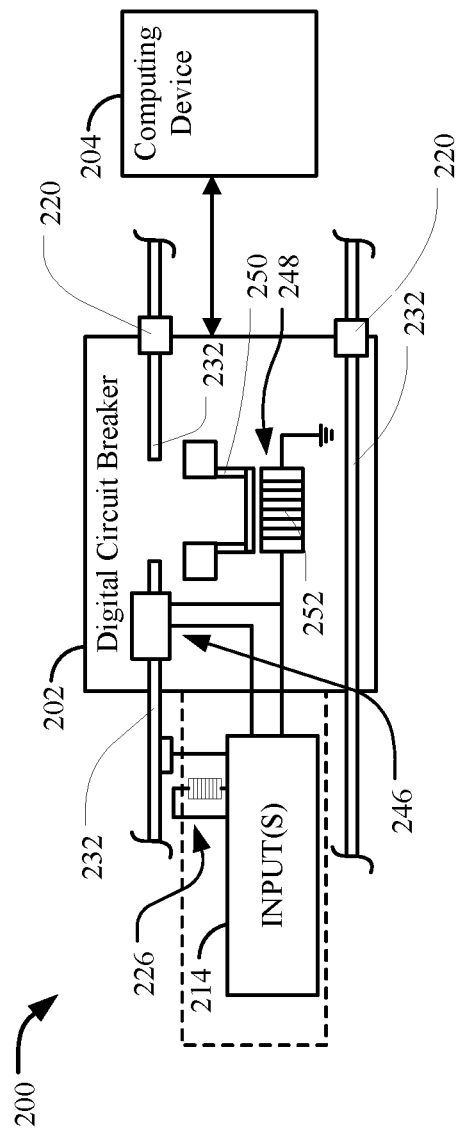
FIG. 3 shows a schematic illustration of the circuit breaker control system of FIG. 2 with the digital circuit breaker in an open position.

By way of example, general operation of a digital circuit breaker is described with respect to a circuit breaker control system 200 illustrated in FIGS. 2 and 3. FIG. 2 illustrates the circuit breaker control system 200, with a digital circuit breaker 202 in a closed position, and FIG. 3 illustrates the circuit breaker control system 200 with the digital circuit breaker 202 in an open position. The circuit breaker control system 200 of FIGS. 2 and 3 can be a specific implementation of the circuit breaker control system 100 of FIG. 1 and, thus, descriptions herein of components of the circuit breaker control system 100 may equally apply to like components of the circuit breaker control system 200 and vice versa.

As shown in FIGS. 2 and 3, the circuit breaker control system 200 includes a digital circuit breaker 202 and a computing device 204 in communication with the digital circuit breaker 202. The digital circuit breaker 202 also includes a processor (not shown), inputs 214 (such as general input output pins), which can interface communication between the digital circuit breaker 202 and one or more sensors, components, outputs, etc., terminals 220 to be connected to an electrical trace heater, and sensors 226 configured to measure a voltage and/or current provided to an electrically connected electric trace heater. For example, the sensors 226 can measure voltage and/or current of conductors 232, which may be electrically connected to an electric trace heater via terminals 220.

The digital circuit breaker 202 can disrupt or otherwise prevent current from being provided to the electric trace heater electrically connected to the digital circuit breaker 202. For example, the digital circuit breaker 202 can include a solid state switch 246 (e.g., an integrated gate-commutated thyristor, other thyristor, etc.), which can either allow or disrupt current flow through the conductor 232 to the electric trace heater, for example, by the presence (or absence) of a signal (e.g., a gate signal) provided to the solid state switch 246 by the inputs 214. The use of a solid state switch 246 can be particularly helpful in situations that require faster response times, as the solid state switch 246 can be much faster in reacting to high and fast currents and fault conditions than a contact-operated switch.

As shown in FIGS. 2 and 3, the digital circuit breaker 202 can also include an actuator mechanism 248, e.g., a contact-operated switch. The actuator mechanism 248 includes an actuator 250 and a solenoid 252 that interfaces with the inputs 214. Based on an operating condition of the digital circuit breaker 202 (such as a sensor value exceeding a threshold), the solenoid 252 can be powered, thereby causing the actuator 250 to retract and open the circuit by moving out of contact with the conductor 232. In some cases, the solid state switch 246 can include electrical components configured to provide or disrupt power to the solenoid 252 to cause the actuator mechanism 250 to open.

In some embodiments, the digital circuit breaker 202 can acquire time-current information (e.g., current over a period of time) based on the sensed current provided to the electric trace heater. For example, the processor of the digital circuit breaker 202 can acquire current or voltage values from the sensors 226 at a sampling rate (and, if using voltage values, convert the voltage values to current values). The processor can determine an elapsed time from a starting point, such as when current flow is initially provided to the electric trace heater (e.g., when the actuator 250 of the actuator mechanism 248 contacts the conductor 232, as sensed by the sensors 226, or when the solid state switch 246 is deactivated), or another point in time. The processor can then determine time-current information using the sampled current values (or an average of the values) over the elapsed time period, and use the time-current information for disrupting current flow to the electric trace heater (e.g., by activating the solid state switch 246 or the actuator mechanism 248) based on a stored time-current curve.

More specifically, in some embodiments, the processor of the digital circuit breaker 202 disrupts current flow to the electric trace heater based on a comparison of the time-current information relative to the stored time-current curve. In some configurations, the processor can directly compare the time-current information by plotting and integrating the time-current information to extract time-current values that can be compared to the stored time-current curve (such as a plot, graph, values, etc.). In some embodiments, the processor can determine a rate of change of the current over time (e.g., a derivative of a time-current graph, plot, data, etc.) to control the disruption of current to the electric trace heater. For example, if the time-current information exceeds the time-current curve, or if the derivative of the time-current plot exceeds a predefined rate (e.g., defined by the stored time-current curve), the processor can cause a disruption of current flow to the electric trace heater. These descriptions of determining the time-current information and comparing such information to the time-current curve are only intended to be examples and other methods for determining and using time-current information may be used in certain embodiments.

Figure 4:
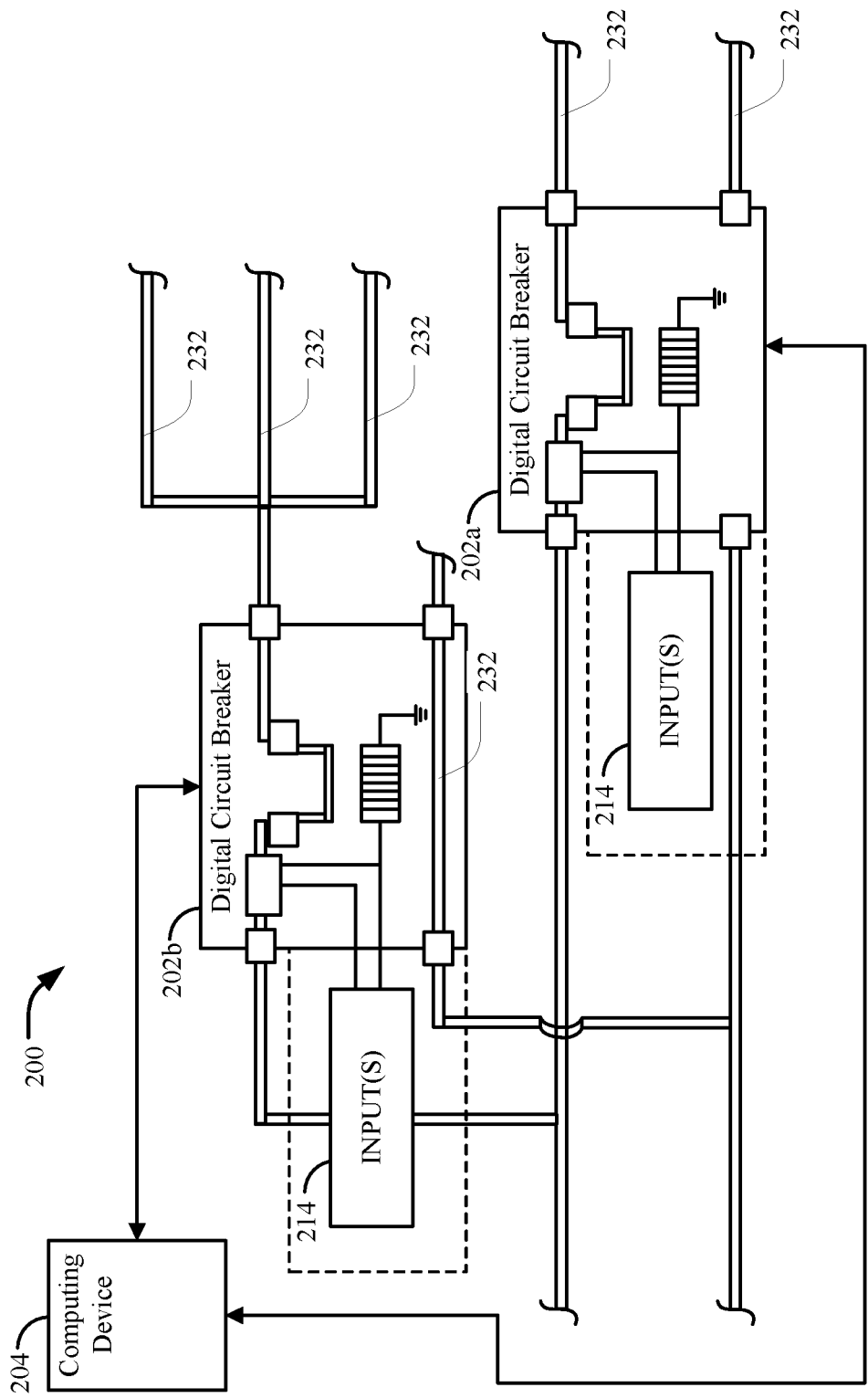
FIG. 4 shows a schematic illustration of another circuit breaker control system.

In some embodiments, a system may incorporate multiple digital circuit breakers 202. For example, FIG. 4 shows another implementation of the system 200 including multiple digital circuit breakers 202 controlling multiple electric trace heaters. More specifically, a first digital circuit breaker 202a can control one electric trace heater via conductors 232, while a second digital circuit breaker 202b can control three electric trace heaters via conductors 232, where each of the electric trace heaters are parallel to each other (e.g., operating at the same voltage). In such configurations, the time-current curve can be constructed based on a parallel configuration of electric trace heaters (e.g., three parallel electric trace heaters, or other numbers of electric trace heaters). Additionally, as shown in FIG. 4, the multiple digital circuit breakers 202a, 202b can be in communication with a single computing device 204. However, in other embodiments, each digital circuit breaker 202a, 202b can be in communication with a separate computing device 204, where the separate computing devices 204 are configured to communicate with each other.

Referring back to the system 100 of FIG. 1, the circuit breaker control system 100 can include one or more sensors 148. Each of the sensors 148 and, more specifically, the sensor values measured, determined, or obtained by the sensors 148, can be used by the circuit breaker control system 100 to control an aspect of the digital circuit breaker 102, such as the time-current curve of the digital circuit breaker 102, as further described below. The sensors 148 can be in communication with the digital circuit breaker 102, the computing device 104, and/or other components associated with the digital circuit breaker 102 or the computing device 104 (such as a separate controller device, described below, in communication with the digital circuit breaker 102). Furthermore, in some embodiments, some or all of the sensors 148 can be part of the digital circuit breaker 102, can be part of the computing device 104, can be part of a separate controller device, or can be stand-alone remote devices in communication with the digital circuit breaker 102, the computing device 104, and/or the controller device. In some embodiments, the sensors 148 can include one or more of the following: a temperature sensor to sense a temperature, a vibration sensor to sense a vibration, a flow sensor to sense a flow of a fluid (e.g., liquid or air), a pressure sensor to sense a pressure, a location sensor (e.g., a GPS) to sense a location, a ground fault leakage current sensor to sense a leakage current, or others, as further described below with respect to FIG. 5.

In addition, or as an alternative to, the sensor values, the circuit breaker control system 100 can control an aspect of the digital circuit breaker 102, including the time-current curve of the digital circuit breaker 102, based on outside data, such as ambient temperature data or weather data. For example, in some embodiments, the digital circuit breaker 102 can obtain ambient temperature data (e.g., directly or via the communication network 108 from the computing device 104 or the server 106) for a location in which the digital circuit breaker 102 is operating (e.g., a country, a longitudinal axis, a latitudinal axis, a city, a continent, etc.). As another example, in some embodiments, the digital circuit breaker 102, the computing device 104, the server 106, or other computing devices, can receive weather data for a location in which the digital circuit breaker 102 is operating. Such weather data can include an ambient temperature, wind speed, precipitation (and type of precipitation), weather fronts (e.g., a cold front, a warm front, etc.), or other relevant data. In some embodiments, the location sensor 148 noted above (e.g., a GPS) can be used to provide location data, from which corresponding ambient temperature data and/or weather data can be obtained. In other embodiments, a location can be input to the computing device 104 or the digital circuit breaker, from which corresponding ambient temperature data and/or weather data can be obtained. In some embodiments, the temperature and/or weather data can be utilized in addition to other sensor data provided by the sensors 148. In other embodiments, the circuit breaker control system 100 does not include the sensors 148 and only relies on the temperature and/or weather data to control aspects of the digital circuit breaker 102.

Figure 5:
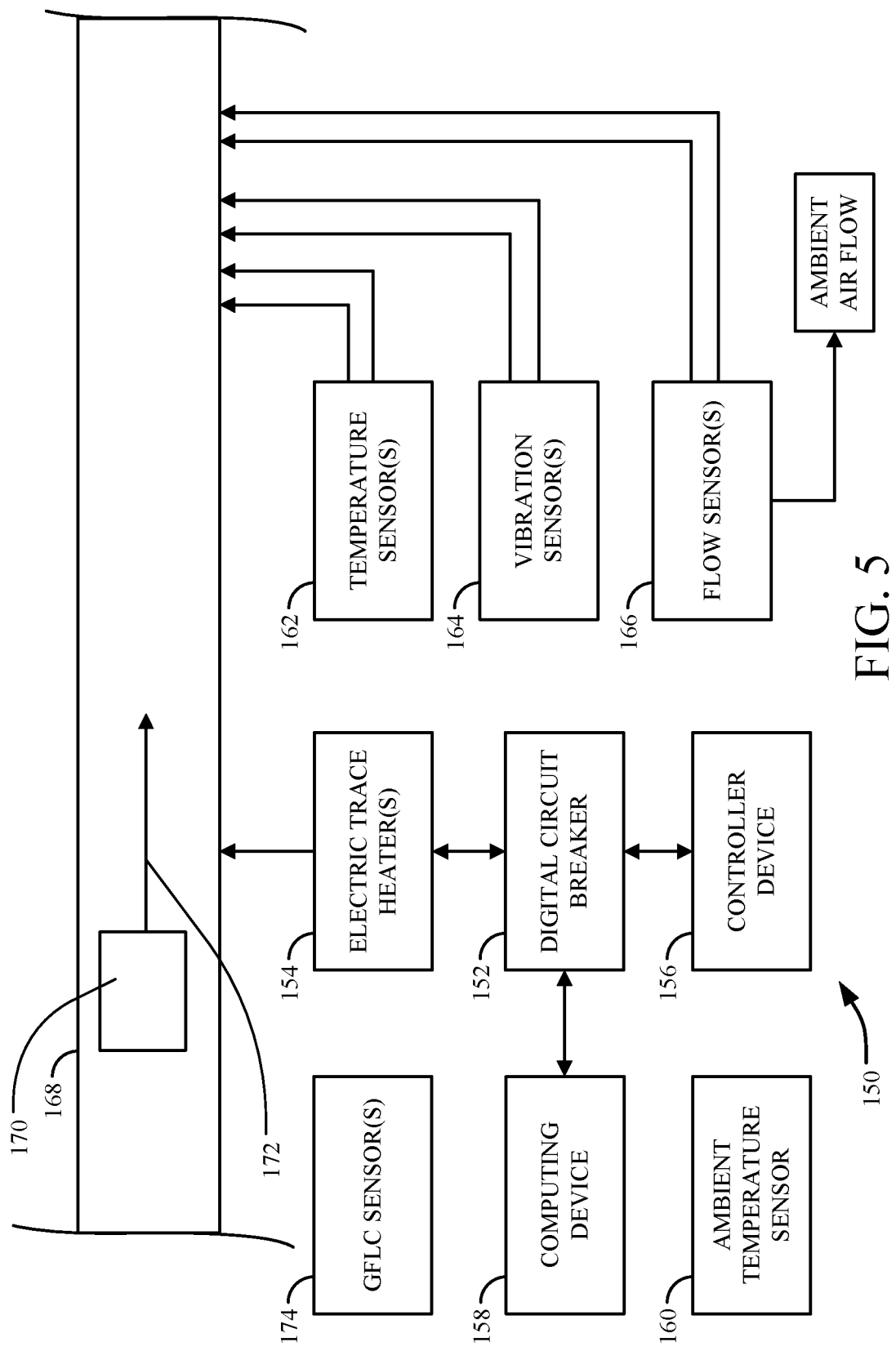
FIG. 5 shows a schematic illustration of yet another circuit breaker control system.

FIG. 5 illustrates another circuit breaker control system 150 including some of the above-described sensors. The circuit breaker control system 150 can be a specific implementation of the circuit breaker control system 100 of FIG. 1 and, thus, descriptions herein of components of the circuit breaker control systems 100, 200 may equally apply to like components of the circuit breaker control system 150 and vice versa. More specifically, as shown in FIG. 5, the system 150 can include a digital circuit breaker 152, one or more electric trace heaters 154, a controller device 156, a computing device 158, an ambient temperature sensor 160, one or more additional temperature sensors 162, one or more vibration sensors 164, one or more flow sensors 166 and/or one or more ground fault leakage current ("GFLC") sensors 174. The digital circuit breaker 152, the controller device 156, and the computing device 158 can be in communication with each other (e.g., to transmit instructions to and receive data from each other).

As shown in FIG. 5, the electric trace heater 154 is in contact with a component 168 to be heated, such as a pipe, a vat, a tank, a slab (e.g., of concrete, stone, etc.), a container, a vessel, etc. In some applications, the component 168 can be configured to receive a fluid 170 that flows along the component 168 in a downstream direction 172. The fluid 170 may be in liquid form while flowing, but may also solidify into a solid in certain environments, such as cold ambient temperatures. Additionally, the electric trace heater 154 is electrically connected to the controller device 156 (e.g., a trace heating controller device) and the digital circuit breaker 152.

In some embodiments, the ambient temperature sensor 160, the temperature sensors 162, the vibration sensors 164, the flow sensors 166, and GFLC sensors 174, can each be in communication with one or more of the digital circuit breaker 152, the controller device 156, and/or the computing device 158 via wired or wireless connections. While the sensors 160, 162, 164, 166 will be described hereinafter with reference to being in communication with the digital circuit breaker 152, it should be noted that the description can be applied to the controller device 156 or the computing device 158 in some embodiments. Based on inputs from one or more of the sensors 160, 162, 164, 166, the digital circuit breaker 152 can adjust its time-current curve to improve operation of the electric trace heater 154 (e.g., avoid unnecessary trips). This can include, for example, shifting a portion of the time-current curve (e.g., translating the time-current curve along its time axis or current axis), adjusting a shape of a portion of the time-current curve, etc., based on the sensor values.

The ambient temperature sensor 160 can be exposed to the ambient environment to sense a temperature of the ambient environment. In this way, the digital circuit breaker 152 can modify its time-current curve based on the ambient temperature received by the ambient temperature sensor 160. In some cases, the ambient temperature sensor 160 can be positioned within or on a housing of the digital circuit breaker 152, a housing of the controller device 156, or a housing of the computing device 158. Additionally, in some embodiments, the ambient temperature sensor 160 can be a thermocouple, a thermistor, etc.

In some embodiments, the one or more temperature sensors 162 can each be in thermal contact with the component 168 and, thus, each temperature sensor 162 can sense the temperature of a portion of the component 168. In some embodiments, when there are multiple temperature sensors 162 (e.g., two, three, four, etc.), each temperature sensor 162 can be distributed along different locations of the component 168, separated from each other by various distances. For example, each temperature sensor 162 can be separated from each other by relatively small distances (e.g., less than one meter), or relatively far distances (e.g., greater than a meter). In this way, some temperature sensors 162 can be situated at remote places along the component 168 that may have different thermal properties. For example, a first temperature sensor 162 can sense a temperature indicative of a liquid from the fluid 170, however, upstream or downstream of the first temperature sensor 162 a second temperature sensor 162 can sense a temperature indicative of the fluid 170 having been solidified at that location of the component 168. In this way, additional temperature information can be captured to control aspects of the digital circuit breaker 152. For example, if the digital circuit breaker 152 (or the controller device 156 or the computing device 158) receives a temperature value that is below a threshold (e.g., a freezing temperature of the fluid 170), then the digital circuit breaker 152 can use a modified time-current curve, and refrain from using a default time-current curve (e.g., that is based on normal temperature conditions). In this way, the relatively cool temperature sensed by the temperature sensor 162 indicates that the component 168 (and the fluid 170 contained therein) has not been heated to a sufficient amount and thus the modified time-current curve should be utilized to mitigate undesirable tripping events. In some embodiments, the temperature sensor 162 can be a distributed temperature sensor or linear temperature sensor, as opposed to multiple individual temperature sensors.

In some embodiments, the temperature sensor(s) 162 can include a temperature sensor 162 for each electric trace heater 154 within the system 150. In this way, each of these temperature sensors 162 can sense the temperature of the respective electric trace heater 154, which can be used for control of aspects of the digital circuit breaker 152. For example, if the temperature sensed by the temperature sensor is below a temperature threshold for a period of time (e.g., greater than an hour, 12 hours, 1 day, etc.) the digital circuit breaker 152 can trip and/or emit an alarm. In this way, the inability of the electric trace heater 154 to reach a particular temperature may indicate that the electric trace heater should be checked, replaced, reinstalled, etc.

In some embodiments, the vibration sensor(s) 164 can be implemented in a similar manner as the temperature sensors 162. For example, the vibration sensor(s) 164 can include a single vibration sensor 164 configured to sense a vibration of the component 168, or multiple vibration sensors 164 (e.g., two, three, four, etc.) positioned along different locations of the component 168. That is, each vibration sensor 164 is in vibrational contact with the component 168, and thus each vibration sensor 164 can sense the vibration of a portion of the component 168. In some embodiments, when there are multiple vibration sensors 164, each vibration sensor 164 can be distributed along different locations of the component 168, separated from each other by various distances. For example, each vibration sensor 164 can be separated from each other by relatively small distances (e.g., less than one meter), or relatively far distances (e.g., greater than a meter). In this way, additional vibration information can be captured to control aspects of the digital circuit breaker 152. For example, if the digital circuit breaker 152 (or the controller device 156 or the computing device 158) receives a vibration value that is below a threshold (e.g., indicating the fluid 170 having been solidified at some location within the component 168), the digital circuit breaker 152 can use a modified time-current curve, and refrain from using a default time-current curve (e.g., that is based on more normal conditions). In this way, a relatively low vibration sensed by the vibration sensor 164 indicates that the component 168 (and the fluid 170 contained therein) has not been heated to a sufficient amount and, thus, the modified time-current curve should be utilized to mitigate undesirable tripping events.

In some embodiments, the flow sensor(s) 166 can also be implemented in a similar way as the previously described sensors. For example, the flow sensor(s) 166 can include a single flow sensor 166 or multiple flow sensors 166 (e.g., two, three, four, etc.). Each flow sensor 166 can be positioned within the component 168 (e.g., in contact with the fluid 170) and can be configured to sense the flow rate of the fluid 170 flowing through the component 168. In some embodiments, when there are multiple flow sensors 166, each flow sensor 166 can be distributed along different locations of the component 168, separated from each other by various distances. For example, each flow sensor 166 can be separated from each other by relatively small distances (e.g., less than one meter), or relatively far distances (e.g., greater than a meter). In this way, some flow sensors 166 can be situated at remote places on the component 168, which could have different flow properties. For example, a first flow sensor 166 can sense a flow rate indicative of a liquid from the fluid 170, however, upstream or downstream of the first flow sensor 166, a second flow sensor 166 can sense a flow indicative of the fluid 170 having been solidified at that location of the component 168 (e.g., a flow rate below a threshold, or a complete lack thereof). In this way, additional flow information can be captured to control aspects of the digital circuit breaker 152. For example, if the digital circuit breaker 152 (or the controller device 156 or the computing device 158) receives a flow value that is below a threshold (e.g., indicating the fluid 170 having been solidified), the digital circuit breaker can use a modified time-current curve, and refrain from using a default time-current curve (e.g., that is based on more normal conditions). In this way, the relatively low flow rate sensed by the flow sensor 166 indicates that the component 168 (and the fluid 170 contained therein) has not been heated to a sufficient amount and, thus, the modified time-current curve should be utilized to mitigate undesirable tripping events.

In some embodiments, the flow sensor(s) 166 can include a flow sensor 166 that senses airflow. For example, this flow sensor 166 can sense the flow rate of the ambient air, or a wind speed. This airflow rate, wind speed, etc., sensed by the flow sensor 166 can be used to control aspects of the digital circuit breaker 152, such as to modify (or determine) a time-current curve for the digital circuit breaker 152. For example, the digital circuit breaker 152 (or the controller device 156 or the computing device 158) can adjust (or determine) the time-current curve to compensate for the ambient airflow. In this way, because ambient airflow can force thermal losses of the electric trace heater 154 (and the component 168), which could further decrease the actual temperature of the electric trace heater 154 and/or required start-up or operating currents of the electric trace heater 154. For example, the ambient airflows can be linearly related to the amount of shifting of the time-current curve along the time axis. As such, each ambient flow rate sensed by the flow rate sensor 166 can be used to determine a corresponding amount of shifting of the time-current curve.

In some embodiments, the GFLC sensor(s) 174 can also be implemented in a similar way as the previously described sensors. For example, the GFLC sensors 174 can include a single or multiple GFLC sensor 174 configured to sense the GFLC of a respective electric trace heater 154. In this way, a computing device can receive each GFLC value, and determine whether or not each GFLC exceeds (e.g., is greater than) a threshold. If the digital circuit breaker 152 (or the controller device 156 or the computing device 158) determines that any GFLC value exceeds the threshold, the digital circuit breaker 152 can trip to disrupt current flow to each electric trace heater 154. If, however, the digital circuit breaker 152 (or the controller device 156 or the computing device 158) determines that none of the GFLC values exceed the threshold, the digital circuit breaker 152 may remain closed to continue providing power to the electric trace heater 154.

In some embodiments, although not shown in FIG. 5, the circuit breaker control system 150 can also include a location sensor (e.g., a GPS sensor), which can be in communication with any of the digital circuit breaker 152, the controller device 156, and the computing device 158. As discussed above, in some cases, location data from the location sensor can be used (by the digital circuit breaker 152 or the controller device 156 or the computing device 158) to determine or adjust the time-current curve of the digital circuit breaker 152. For example, the location data can be used to determine or obtain ambient temperature or weather data, which can then be used to determine the time-current curve.

Figure 6:
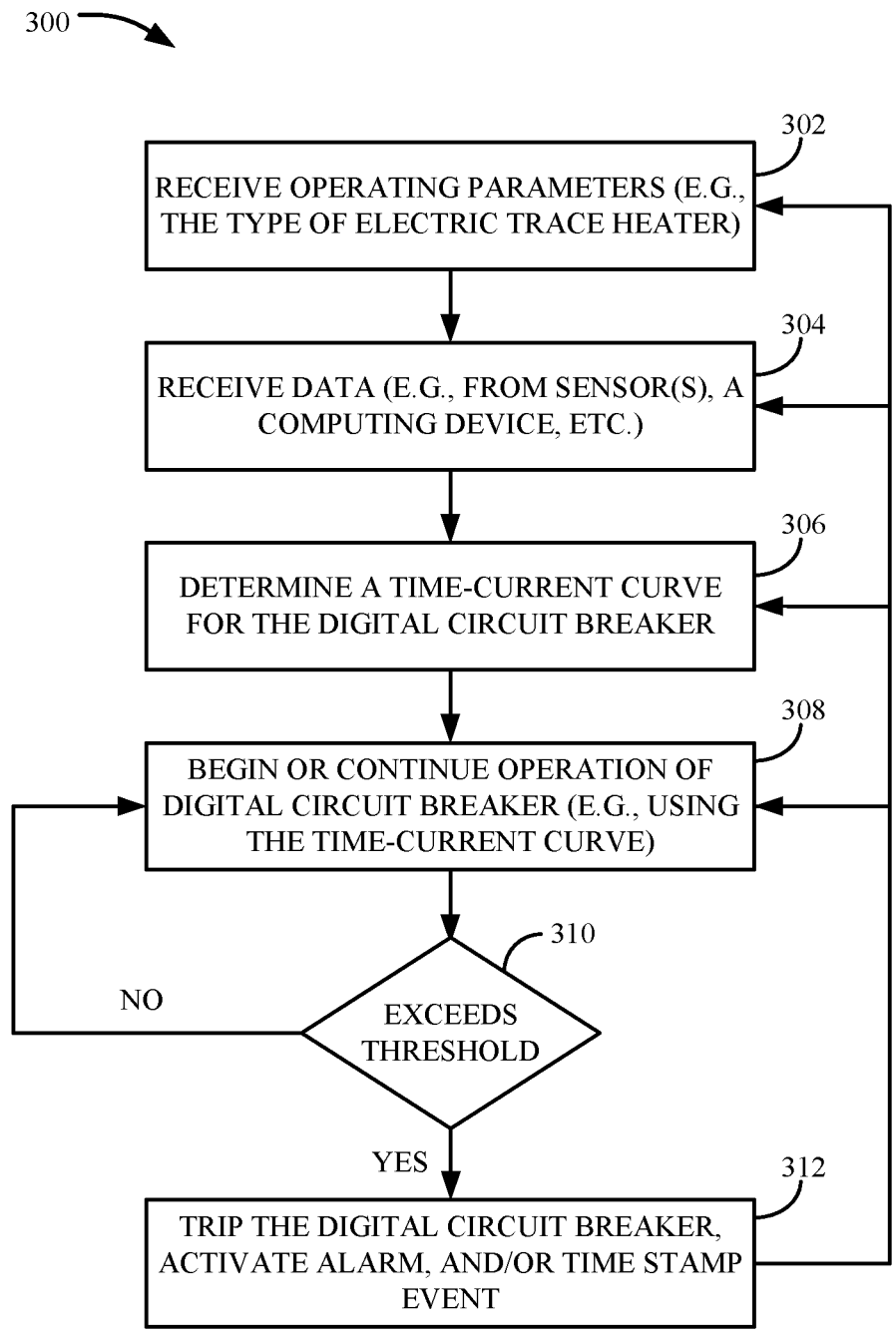
FIG. 6 shows a flowchart of a process for operating a circuit breaker control system.

FIG. 6 shows a process 300 for operating a circuit breaker control system, which can be implemented with any of the circuit breaker control systems described herein. Some or all of the steps of the process 300 can be implemented using one or more computing devices, as appropriate, according to various embodiments of the disclosure. For example, the process 300 can be implemented entirely by the digital circuit breaker 152 (or 102 or 202), the controller device 156, or the computing device 158 (or 104 or 204), or can be implemented in part by some combination of the digital circuit breaker 152, the controller device 156, or the computing device 158. As such, while the following discussion may refer to only the digital circuit breaker 152, the controller device 156, or the computing device 158, the discussion should not be construed as being limited to only such device. That is, while steps of the process 300 may refer to the computing device 158 performing certain operations, in some embodiments, the digital circuit breaker 152 or the controller device 156 may perform such operations.

At step 302, the process includes receiving one or more operating parameters for operating the digital circuit breaker 152. In some cases, a user can interact with a user interface (not shown) of the computing device 158, such as a graphical user interface (that includes various graphical elements) displayed to a user for the user to provide the user inputs. The user inputs can include an indication of a type of an electric trace heater 154 (e.g., a size, a brand, etc.) electrically connected (or to be electrically connected) to the digital circuit breaker 154. In this case, the indication of the electric trace heater 154 can be used to retrieve from memory in the computing device 158, a time-current curve that corresponds to the particular type or size electric trace heater 158. This can provide easy customization of the digital circuit breaker 152, based on a unique time-current curve corresponding to the specific electric trace heater 154. For example, different electric trace heaters 154 can have different features that can impact operation and current characteristics, such as a resistivity of the electric trace heater, a temperature coefficient, a cross-sectional area, an overall length, an impedance, a resistance, an intended operational ambient temperature, material properties, etc. All of these features, and others, can be used to construct a specifically tailored time-current curve (e.g., or modify the time-current curve) to adjust the operation of the digital circuit breaker for the particular electric trace heater 154.

Accordingly, in some embodiments, the computing device 158 can receive individual properties of the electric trace heater 154 corresponding to any one of the above-noted features. That is, the properties can include a length of the electric trace heater, a heating linearity of the electric trace heater (e.g., a linear electric trace heater, a non-linear electric trace heater including a self-regulating electric trace heater), a resistivity of the electric trace heater, an impedance (or a resistance) of the electric trace heater, a cross-sectional area of the electric trace heater (e.g., the electrically conductive portion of the electric trace heater), a material property of the electrically conductive portion of the electric trace heater (e.g., excluding an insulting layer), the temperature coefficient of the electric trace heater, etc. In some cases, the computing device 158, after receiving the type of electric trace heater 154, can query a database of stored datasheets to populate these properties of the electric trace heater that are associated with the type of electric trace heater 154. In other cases, the computing device 158 can receive the properties (or property) manually entered by the user via the user inputs.

As described above, in some embodiments, the digital circuit breaker 152 can be electrically connected to multiple electric trace heaters 154. In such embodiments, at the step 302, the computing device 158 can receive a type of each of the multiple electric trace heaters, and can receive the properties for each electric trace heater 158. In addition, the computing device 158 can receive an indication regarding the number (e.g., two, three, four, etc.) of electric trace heaters 154 to be (or that are) electrically connected to the digital circuit breaker 152, and an indication that the multiple electric trace heaters 154 are in a parallel configuration (e.g., each operating under the same voltage).

In some embodiments, the computing device 158 can receive (e.g., via the one or more user inputs) specific data points or values for generating or modifying one or more stored time-current curves. For example, these specific data points can include a long trip threshold having a long trip time, a short trip threshold having a short trip time, and an instantaneous trip threshold having an instantaneous trip time. In addition, the computing device 158 can receive an intended operational ambient temperature for the electric trace heater (e.g., a minimum allowable ambient temperature for operation of the electric trace heater).

At step 304, the process 300 can include the computing device 158 receiving data from one or more sensors or other device (e.g., the digital circuit breaker 152 or the controller device 156). For example, this can include receiving one or more ambient temperature values (e.g., from the ambient temperature sensor(s) 160), one or more additional temperature values (e.g., from the temperature sensor(s) 162), one or more vibration values (e.g., from the vibration sensor(s) 164), one or more ambient air flow rate values or fluid flow rate values (e.g., from the flow sensor(s) 166), and/or air temperature or weather data based on a location that the electric trace heater 154 is operating in or to be operated in (e.g., based on the GPS location sensor). In some embodiments, the step 304 can include a computing device receiving data for a component to be heated by the electric trace heater. For example, this data can include a thermal mass of the component to be heated (and a material contained in the component, including a thermal mass of liquid flowing through the component, a thermal mass of a solid positioned within the component), a thickness of the component, the material composition of the component (e.g., a metal type), a size of the component (e.g., the length of the component), a temperature coefficient of the component, and a temperature coefficient of the material contained within the component, etc.

At step 306, the process 300 can include the computing device 158 determining or modifying a time-current curve to be used by the digital circuit breaker 152. In some cases, this can include the computing device 158 determining a time-current curve, based on a type of electric trace heater 154. For example, the computing device 158 can determine the time-current curve based on one or more properties of the electric trace heater 154. As a specific example, for relatively longer electric trace heaters, the corresponding impedance is increased, which the computing device 158 can compensate for in the time-current curve. As another example, the computing device 158 can determine a time-current curve based on any of the data received at the step 304 including an ambient temperature, fluid flow rate, vibration, an ambient airflow, weather data, number of electric trace heaters 154, etc. For example, the computing device 158 can determine a time-current curve based on the ambient temperature. This can include the computing device 158 shifting a present time-current curve along the current amplitude axis (e.g., the vertical axis, where the horizontal axis is time), based on the ambient temperature, to generate an adjusted time-current curve. As another example, when multiple electric trace heaters are utilized in parallel, the current requirements for the digital circuit breaker may increase, so that the adjusted time-current curve can mitigate undesirable tripping of the digital circuit breaker 152.

In some embodiments, the step 306 of the process 300 can include the computing device 158 determining or adjusting the time-current curve based on the received specific data point(s) (e.g., the data point of the long trip threshold, the data point of the short trip threshold, and the data point of the instantaneous trip threshold). For example, each data point can provide the framework for the creating the time-current curve. Thus, in this case, the resulting time-current curve can include each of these data point(s), and the portions of the time-current curve between these points can be generated or constructed accordingly. As such, in some embodiments, the step 306 can include the computing device 158 determining the time-current curve based on joining the specific data points received, using particular functions (e.g., linear, exponents, sinusoids, polynomials, etc.). In some embodiments, the time-current curve can include a tolerance or thickness (or hysteresis) to reduce a sharp change in operation when utilizing the time-current curve. In other words, the time-current curve, rather than defining a line, can define a range that extends above and below the line.

Additionally, in some embodiments, the step 306 can include the computing device 158 determining the time-current curve, based on inputting some or all of the data from the steps 302, 304 into a mathematical model. For example, the computing device 158 can take the received data from the steps 302, 304, and can input this into a mathematical model (e.g., a function) that outputs a time-current curve that the digital circuit breaker 152 is to utilize (e.g., by modifying the time-current curve of the digital circuit breaker, 152 or by receiving or generating and subsequently setting the outputted time-current curve for the digital circuit breaker 152 to then utilize).

In some embodiments, the step 306 can include the computing device 158 determining the time-current curve based on parameters of the component to be heated, or parameters of the material housed within the component 168 to be heated. For example, this can include a property of the component 168 to be heated (e.g., that is in contact with the electric trace heater 154) including the thickness of the component 168, the size of the component (e.g., the length of the component 168), the material property (e.g., the heat capacity) of the component 168 (e.g., the type of metal), etc. The parameters of the fluid 170 housed within the component 168 to be heated can include a thermal mass of the material, a material property of the material (e.g., the heat capacity), etc.

As noted above, the device determining the time-current curve may be the computing device 158, or may be the digital circuit breaker 152 or the controller device 156. As such, step 306 may further include communicating values or operating parameters and/or time-current curves between controller device 156, the computing device 158, and the digital circuit breaker 152. For example, step 306 include the computing device 158 or the controller device 156 constructing the determined time-current curve for the digital circuit breaker 152, or modifying a previous time-current curve (e.g., a default time-current curve that is not specifically tailored to the electric trace heater, or other sensor data) that the digital circuit breaker 152 currently utilizes, and communicating the determined time-current curve to the digital circuit breaker 152.

Once the digital circuit breaker 152 sets the determined time-current curve, the digital circuit breaker 152 utilizes the determined time-current curve for operation of the digital circuit breaker at step 308. That is, at 308, the process 300 can include beginning or continuing operation of the digital circuit breaker 152 according to the determined time-current curve. For example, a signal from the solid state switch (or sensors) can indicate that the circuit is open (e.g., the solid state switch, the actuator mechanism, or both are open), or closed (e.g., the solid state switch, the actuator mechanism, or both are closed), along with data regarding previous operation of the solid state switch and the actuator mechanism. Regardless, the processor of the digital circuit breaker 152 can monitor an elapsed time, sampling current (or voltage values) from the sensors. Then, the processor of the digital circuit breaker 152 can determine present power information (e.g., current, voltage, etc.) from the sensors, elapsed time, etc., and other calculations described above, such as averaging, integrating, etc. to determine time-current information.

At step 310, the process 300 can include a computing device (e.g., the processor of the digital circuit breaker 152) comparing the present time-current information to the time-current curve (e.g., acting as the threshold), as described above. For example, when the computing device determines that the present time-current information does not exceed the time-current curve, the process 300 can proceed back to 308. However, when the computing device determines that the present current information exceeds the threshold, the process 300 can proceed to step 312.

At step 312, process 300 includes a computing device (e.g., the processor of the digital circuit breaker 152, the computing device 158, or the controller device 156) causing the digital circuit breaker 152 to disrupt current flowing to the electric trace heater 154, based on the determination at 310, thus initiating a tripping event. In some cases, the solid state switch or the actuator device of the digital circuit breaker is activated, as described above. In some embodiments, the disruption of current provided to the electric trace heater 154 can be included with the actuating of a button indicating a tripping event, an initiation of an alarm (e.g., transmitting an alarm, such as a notification, to the computing device 204), displaying a visual alarm on the digital circuit breaker, initiating an audible alarm, such as on the computing device 158, etc. In some embodiments, once the tripping event has been analyzed, the problem fixed, etc., the digital circuit breaker 152 can be reset and can continue operating, or can be reinitialized based on determining a condition that warrants adjusting (or further modifying) the previous unique time-current curve (e.g., based on received data, or analysis of the data). For example, once the digital circuit breaker has been reset, the process 300 can proceed back to either of the steps 302, 304, 306, 308.

In some embodiments, the steps 302, 304, 306 of the process 300 can be completed periodically, such as at set times or when the computing device 158 determines that data has changed. For example, if the computing device 158 receives a new ambient temperature, different from the previously acquired ambient temperature, then the computing device 158 can revert to step 306 to determine a new time-current curve that factors in the change in ambient temperature. In other words, the process 300 can periodically loop back from step 308 or 310 to 304 in order to receive updated sensor values so that the time-current curve may be updated based on sensed data. As another example, a particular time-current curve may be appropriate during start-up only, and may be adjusted after the start-up period has elapsed. Furthermore, in some embodiments, a computing device can trip the digital circuit breaker (i.e., proceed straight to step 312) based on a retrieved sensor value exceeding a threshold. In this way, costs can be saved because exceeded sensor values (such as temperature values or GFLC values) may indicate that the electric trace heaters are not properly operating. As one specific example, temperature, vibration, or flow values may indicate that the fluid within the component to be heated has solidified and the electric trace heaters have failed to liquefy the fluid to cause the fluid to continue flowing through the component.

Figure 7:
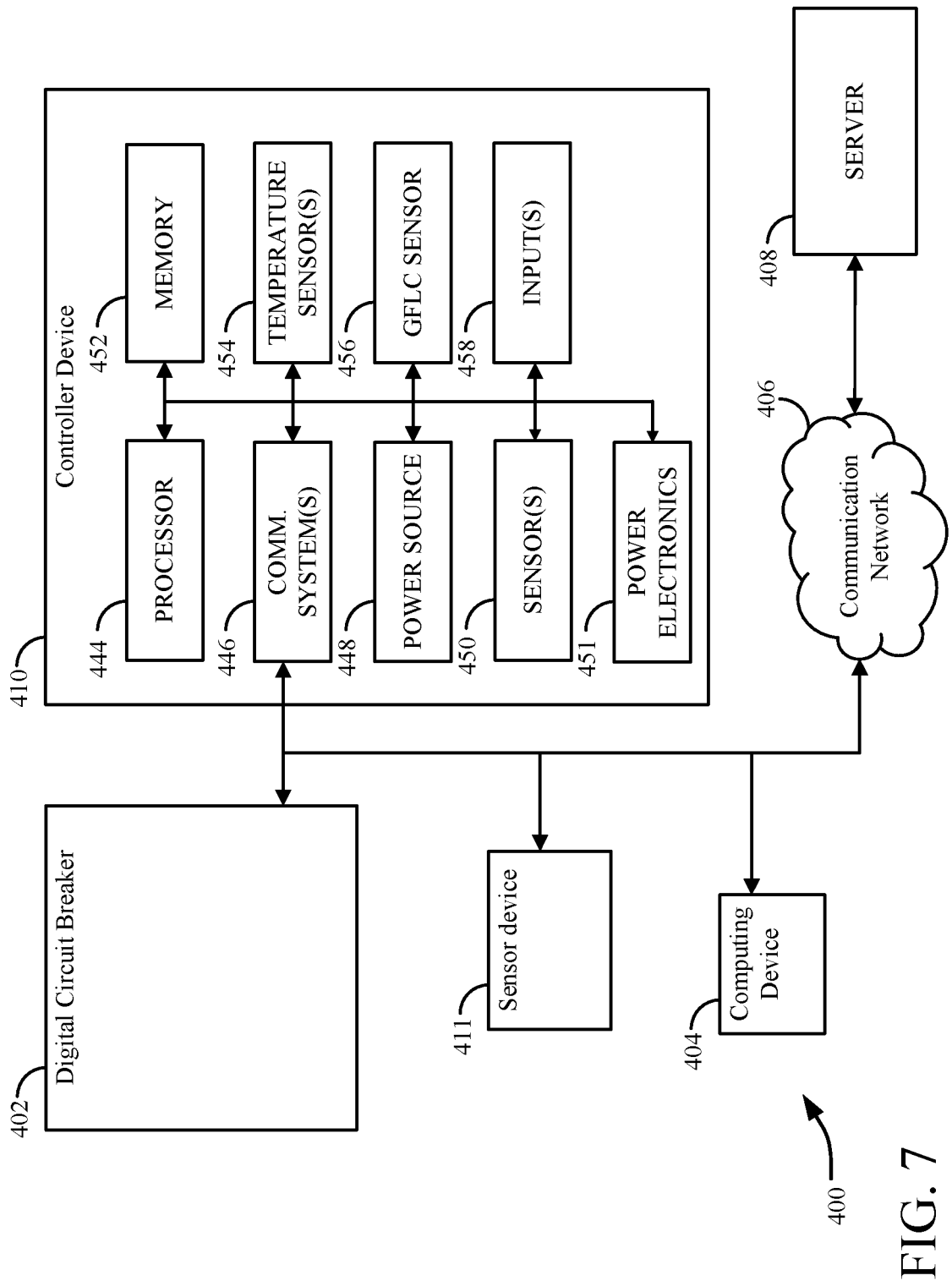
FIG. 7 shows a schematic illustration of a circuit breaker control system.

FIG. 7 illustrates yet another example of a circuit breaker control system 400, according to some embodiments, providing more detail of a controller device 410. As shown in FIG. 7, the circuit breaker control system 400 includes a digital circuit breaker 402, a computing device 404, a server 408, a controller device 410, and a sensor device 411, all of which can communicate with each other directly, or via the communication network 406. It should be noted that the descriptions herein of components of any of the circuit breaker control systems 100, 150, 200 may equally apply to like components of the circuit breaker control system 400 and vice versa. Thus, as an example, the digital circuit breaker 402 can include can include a processor, a display, input(s), power electronics, buttons, terminals, memory, communication systems, sensors, power sources, switches, and conductors.

The controller device 410 can include a processor 444, communication systems 446, power sources 448, sensors 450, power electronics 451, memory 452, temperature sensors 454, ground fault leakage current sensors 456, and inputs 458. In some configurations, the sensors 450 can include vibration sensors, liquid flow sensors (e.g., of fluid, such as oil flowing through a pipe), airflow sensors, pressure sensors, a GPS or other location sensor, etc., as described above. In some embodiments, an electric trace heater (not shown) can be connected to and controlled by the controller device 410. Furthermore, in some embodiments, the controller device 410 (e.g., via the power electronics 451) can modify, change, or adjust the current output from the digital circuit breaker 402 (e.g., based on a sensor value, such as a temperature sensor value).

Figure 8:
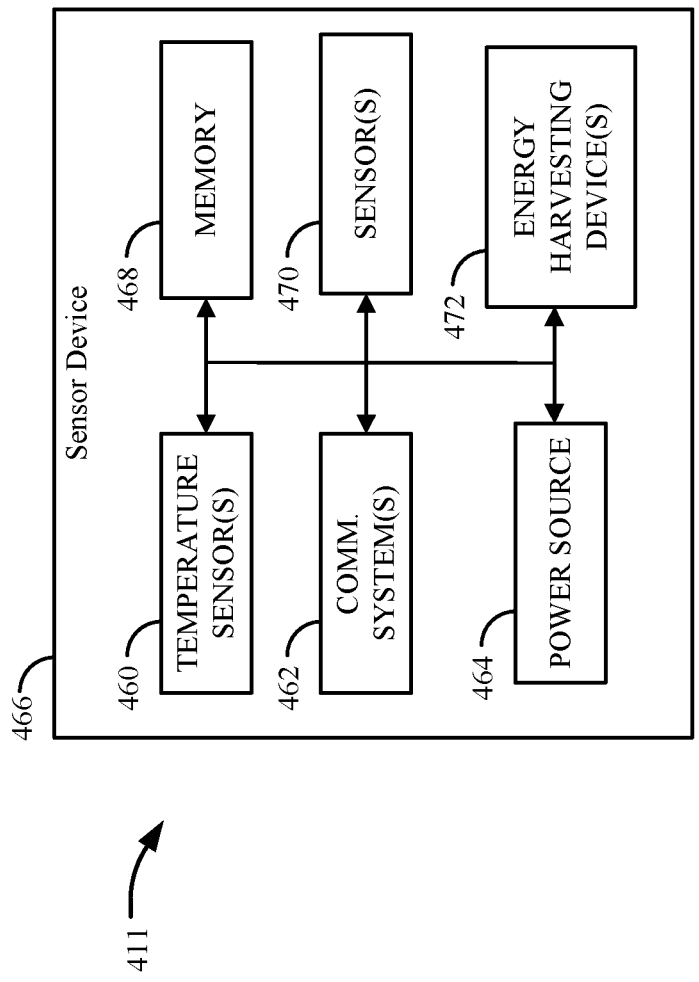
FIG. 8 shows a schematic illustration of an example of a sensor device of the circuit breaker control system of FIG. 7.

FIG. 8 illustrates the sensor device 411 according to some embodiments. The sensor device 411, can include temperature sensors 460 (similar to temperature sensors 454), communication systems 462 (similar communication systems 446), a power source 464 (similar to power sources 448), a housing 466, a memory 468 (similar to memory 452), sensors 470 (similar to sensors 450, which can include vibration sensors, liquid flow sensors, air flow sensors, pressure sensors, GPS location sensors, etc.), and energy harvesting devices 472. In some embodiments, the power source 464 can power all of the components that are included in the sensor device 411. In some embodiments, the power source 464 can be an electrical storage device, such as a battery (e.g., a primary AA battery, a primary AAA battery, etc.), a capacitor (e.g., a super capacitor). In some embodiments, the power source 464 can be a rechargeable battery (e.g., a lithium ion battery). Additionally, the energy harvesting devices 472 can comprise a photovoltaic element (e.g., a crystalline silicon element), a thermoelectric generator, a piezoelectric harvesting element, etc. In some configurations, the energy harvesting device 472 can supply power to the power source 464, such as when the power source 464 is implemented as a rechargeable battery. Although shown together, in some embodiments, the sensor device 411 can only have a power source 464 (e.g., a battery), or can only have an energy harvesting device 472.

In some configurations, all of the components within the sensor device 411 can be packaged within the housing 466 so as to easily install the sensors device 411 along a structure. As a specific example, a housing of the sensor device 411 can be mechanically coupled to a component 168 to be heated (such as a pipe that receives oil, gas, etc.), for remote monitoring of sensor parameters. In some configurations, although not needed, the sensor device 411 can include processing or other circuitry. As such, the sensor device 411, in a single package powered on its own, can remotely monitor parameters and communicate such parameter values to the controller device 410 (e.g., via wired or wireless connection).

Figure 9:
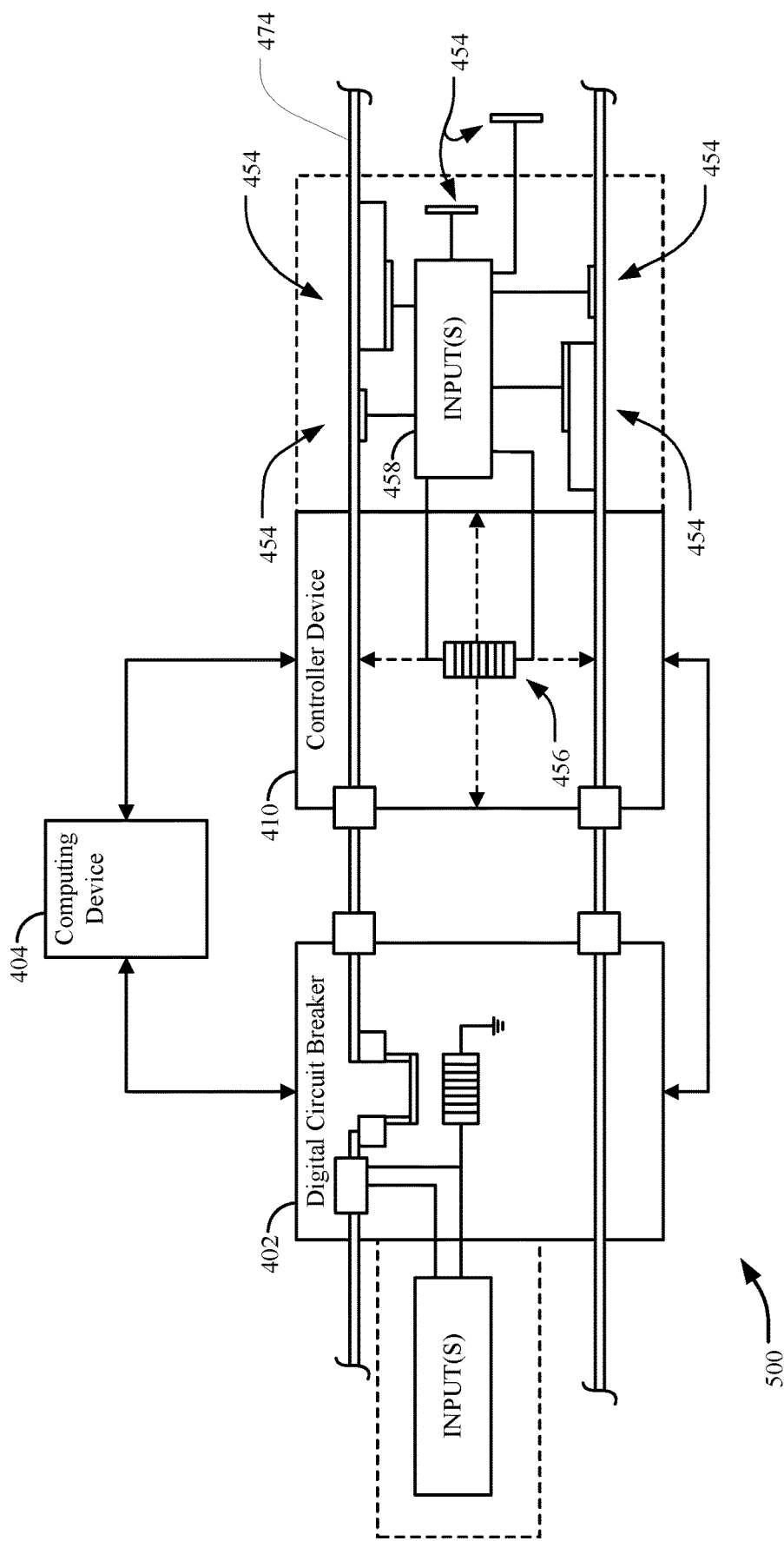
FIG. 9 shows a schematic illustration of a circuit breaker control system with a digital circuit breaker in a closed position.

FIG. 9 illustrates another circuit breaker control system 500, according to some embodiments, including a digital circuit breaker 402 in a closed position. The circuit breaker control system 500 can be a specific implementation of the circuit breaker control system 400 and, thus, the descriptions herein of components of the circuit breaker control system 400, or any of the circuit breaker control systems 100, 150, 200, may equally apply to like components of the circuit breaker control system 500 and vice versa. Thus, similar to the digital circuit breaker 202, the digital circuit breaker 402 also includes an actuator mechanism, sensors, and solid state switches. Additionally, in some embodiments, the sensors 450 of the controller device 410 can be similar to the sensors of the digital circuit breaker 402, such as, current sensors, voltage sensors, etc.

As shown in FIG. 9, a ground fault leakage current sensor 456 can be incorporated into the controller device 410 and positioned to sense current running to the electric trace heater 474. In some embodiments, the sensor value from the ground fault leakage current sensor 456 can be an amplitude or a presence signal. For example, when currents through the conductors to the electric trace heater 474 are unbalanced, a signal is received by the ground fault leakage current sensor 456. In some configurations, the ground fault leakage current sensor 456 need only be on the load side of the electric trace heater 474.

Thus, the controller device 410 can sense a ground fault leakage current event via a GFLC sensor 456 and, as a result, can cause the digital circuit breaker 402 to trip. In this manner, the system 500 can provide an extra layer of protection and or prevent shock hazards, or in some cases, can prevent the need for some, or all, of the electrical components connected to the digital circuit breaker 402 to implement separate ground fault leakage current detection. In other words, the controller device 410 (or the digital circuit breaker 402) having a ground fault leakage current detector can prevent the need for other extraneous ground fault leakage current detectors. Notably, GFLC events can be particularly problematic in electric heat tracing applications in hazardous environments that have volatile combustible vapors, dusts, fibers, etc., as leakage currents in these environments can be more likely to start fires. Thus, by tripping the digital circuit breaker 402 when a GFLC event is detected, the quick prevention can mitigate these risks in such environments.

Furthermore, in some embodiments, temperature sensor values can be monitored to override tripping the digital circuit breaker 402. Additionally, multiple controllers 410, or multiple sensors within a single controller 410 can provide temperature sensor values that indicate spatial temperature information along the component 168 (e.g., information regarding temperature gradients of the electric trace heater 474), which can be used to override tripping the digital circuit breaker 402. In one example, if the temperature of a component 168 (such as a pipe that receives oil or gas) is relatively cold in the field, operation of the digital circuit breaker 402 can be adjusted based on the sensed temperature values (e.g., to prevent opening of the digital circuit breaker when a GFLC event is also not detected).

Referring back to FIG. 9, the digital circuit breaker 402, the controller device 410, and the computing device 404 are all in communication. Thus, data, instructions, etc., can be transmitted and received by these devices. Additionally, the temperature sensors 454 of the system 500 can be in direct thermal communication with the electric trace heater 474 (e.g., coupled to the electric trace heater, such as to the insulation of the electric trace heater) or can be in indirect thermal communication with the electric trace heater 474 (such as coupled to a heat sink in thermal communication with the electric trace heater 474 or a component to be heated by the electric trace heater 474). Additionally, in some embodiments, the temperature sensors 454 can measure an ambient temperature of the outside environment (e.g., external to the housing of the controller device 410). Additionally or alternatively, the temperatures sensors 454 can be positioned within a housing of the controller device 410, as shown in FIG. 9, or a housing of the digital circuit breaker 402, so as to monitor the temperature of the controller device 410, the temperature of the digital circuit breaker 402, or both.

In some embodiments, the controller device 410 can include components, functionalities, etc., to implement some or all of the processes described herein (e.g., the process 300). In this case, the controller device 410, when appropriate, can instruct the digital circuit breaker 402 to disrupt current provided to the electric trace heater 474 and/or can provide time-current curves to the digital circuit breaker 402. In some embodiments, all the data received by the digital circuit breaker 402 can be communicated to the controller device 410, such that the controller device 410 can conduct the appropriate analysis to determine or update time-current curves and/or tripping conditions.

Figure 10:
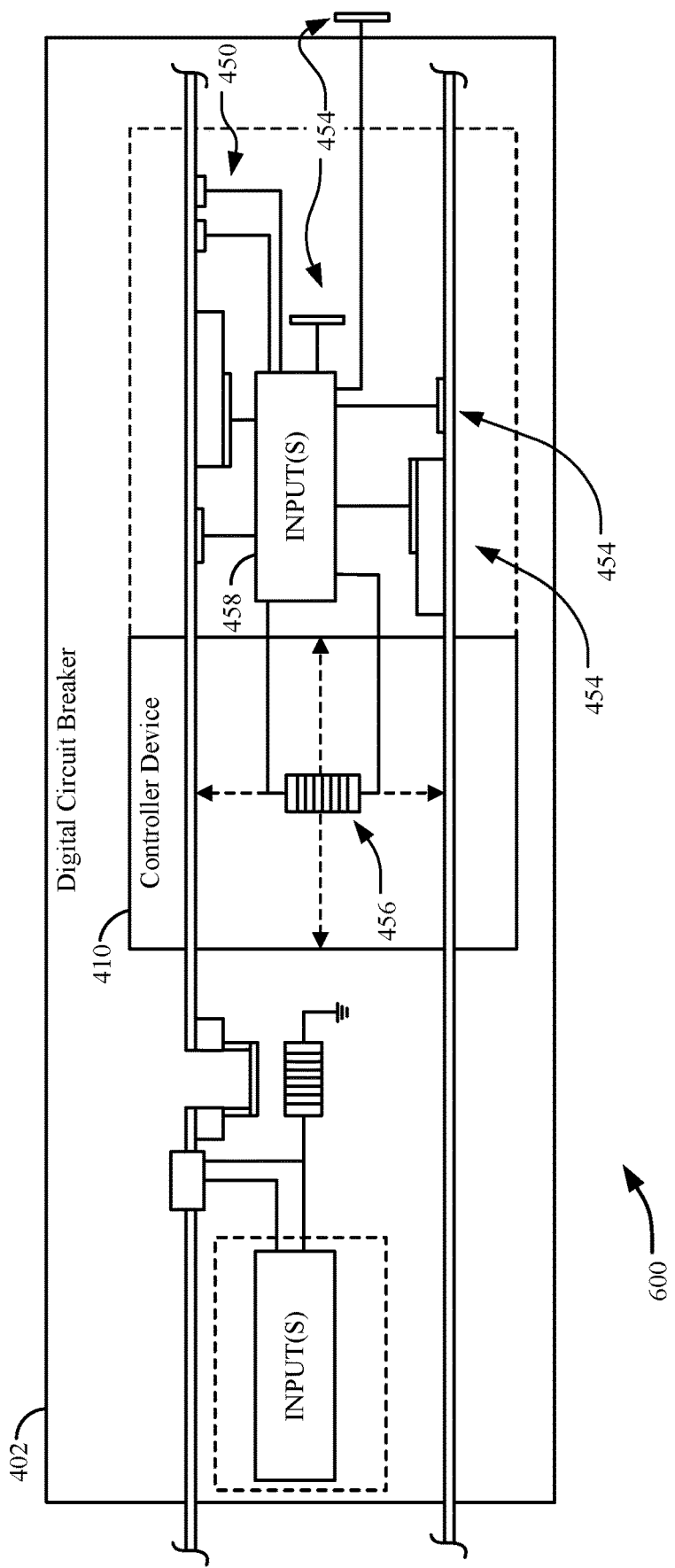
FIG. 10 shows a schematic illustration of a circuit breaker control system with a digital circuit breaker having a controller device integrated therein.

FIG. 10 shows an example of a circuit breaker control system 600, which includes the digital circuit breaker 402 having a housing that encapsulates the controller device 410 and components of the controller device 410. In some embodiments, the controller device 410 can monitor the temperature of the digital circuit breaker 402, which can be utilized for different processes. For example, one of the temperature sensors 454 can monitor a temperature within internal volume of the digital circuit breaker 402. In other configurations, one of the temperature sensors 454 can be placed in thermal communication (e.g., directly via direct contact or indirectly via a heat sink) with a component of the digital circuit breaker 402, such as the processor or another component. For example, such a component may require a tight temperature tolerance range (as compared to other components of the digital circuit breaker 402 with larger temperature tolerance ranges).

Accordingly, FIG. 10 illustrates the system 600 having a digital circuit breaker 402 and the controller device 410 incorporated into a common housing, forming a hybrid circuit breaker-heat trace control system. While FIG. 10 shows the digital circuit breaker 402 incorporating the controller device 410, in alternative configurations, a housing of the controller device 410 can encapsulate the digital circuit breaker 402. This alternative configuration can be advantageous in that it can allow for a more streamlined implementation of the digital circuit breaker 402 with the controller device 410. For example, in such implementations, an off-the-shelf digital circuit breaker 402 can be disposed in a strategic position (e.g., with appropriate contact with a temperature sensor 454 of the controller device 410) within the housing of the controller device 410. As a result, no modifications to the digital circuit breaker 402 need to be made (e.g., the internal components of the digital circuit breaker do not need to be accessed). In yet other configurations, the digital circuit breaker 402, the controller device 410, or their individual components, can be housed within a common housing to form a hybrid circuit breaker-heat trace control system.

Figure 11:
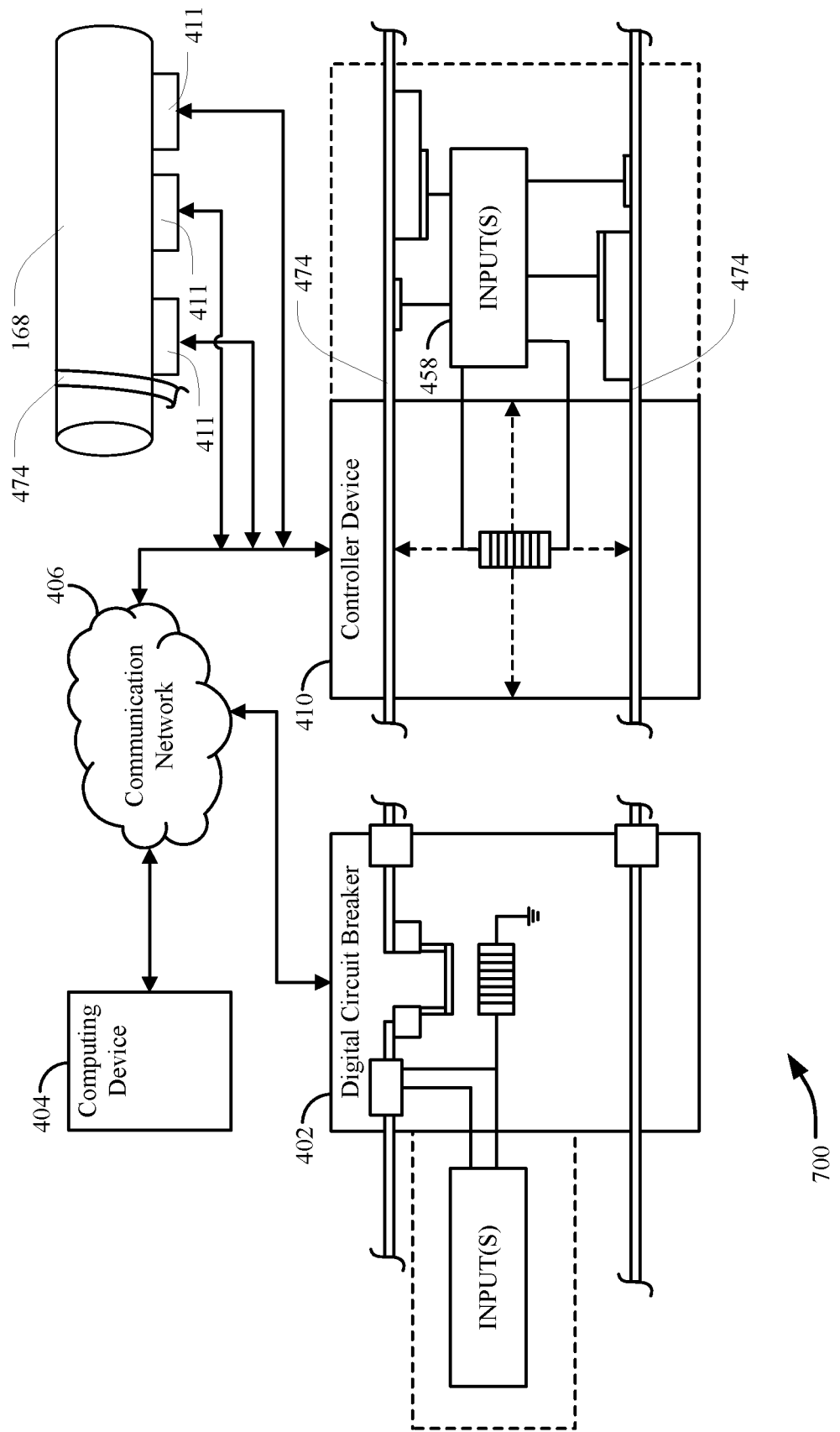
FIG. 11 shows a schematic illustration of another circuit breaker control system.

FIG. 11 shows a circuit breaker control system 700, according to some embodiments, which includes the digital circuit breaker 402, the computing device 404, the communication network 406, the controller device(s) 410, and sensor devices 411. As illustrated in FIG. 11, the controller device 410 is separate and remote from the digital circuit breaker 402, and the digital circuit breaker 402 can receive information determined by the controller device 410 via the communication network 406. In alternative configurations, one controller device 410 can be housed with the digital circuit breaker 402 (e.g., as described above with respect to the system 600 of FIG. 10) and another controller device 410 can be situated in a remote location.

In some embodiments, the controller device 410 can be positioned near the electric trace heater 474 to control the electric trace heater 474 and to monitor various parameters of the electric trace heater 474. However, in other configurations, the controller device 410 can be positioned in a remote location to control the electric trace heater 474 and monitor various parameters of the electric trace heater 474, such as a temperature related to the electric trace heater 474 (e.g., of the electric trace heater 474, conductors, other components to be heated by the electric trace heater 474, such as pipes, ambient temperatures, etc.).

For example, as shown in FIG. 11, the electric trace heater 474 is coupled to (e.g., and positioned along) a component 168 to be heated, such as a pipe for oil or gas. The sensor devices 411 can be situated remote from the controller device 410 and coupled to the component 168. The sensor devices 411 can measure a temperature, flow, vibration, and/or other parameter of the component 168 (or a fluid within the component 168), directly or indirectly (e.g., indirectly measuring temperature can be accomplished by measuring a temperature of a heat sink in thermal communication with the component 168). In some configurations, the sensor device 411 can include a single sensor, such as a single temperature sensor that measures a temperature of the electric trace heater 474. In some embodiments, the sensor devices 411 can transmit the sensor data to the controller device 410 for subsequent processing and/or transmission to the digital circuit breaker 402. In other configurations, the sensor devices 411 can transmit sensor data through the communication network 406 (or directly) to the digital circuit breaker 402 or the computing device 404.

In some embodiments, the controller 410 (and/or the digital circuit breaker 402 or the computing device 404) can be configured to determine a health score of the electric trace heater 474. The health score can be a percentage, value from 0-100, value from 0-10, or other value indicative of a "health" or lifespan of the electric trace heater, such that a relatively low health score can provide an indication to the user that the electric trace heater 474 needs to be serviced or replaced. For example, one of the sensed parameters discussed herein (e.g., impedance, resistance, temperature coefficient, ground fault leakage current, temperature, resistivity, vibration, flow, power factor, voltage, current, apparent power, real power, etc.), alone or in combination, or over a time period, can be used to determine the health score. For example, increases in the ground fault leakage value (e.g., amplitude or occurrences) over a time period can indicate that the integrity of the electric trace heater 474 is decreasing (e.g., the electric trace heater 474 is "leaking" current), thus leading to a low health score, indicating that the electric trace heater 474 should be serviced or replaced (e.g., the integrity of the electric trace heater 474 has been compromised, such as by way of damage to the electric trace heater jacket).

As another example, monitoring the temperature of the electric trace heater 474 over time (and at additional locations along the electric trace heater) can help determine health information of the electric trace heater, such as the health score. In particular, if the temperature of the electric trace heater 474 is decreasing over time (e.g., weeks), this may indicate that the internal structure of the electric trace heater 474 is not providing sufficient heat and, thus replacement or repair of the electric trace heater 474 may be desirable (as indicated by the decrease in the health score). It should be noted that, while the health score is described with respect to the system 700 of FIG. 11, it may be incorporated into any system described herein.

Figure 12:
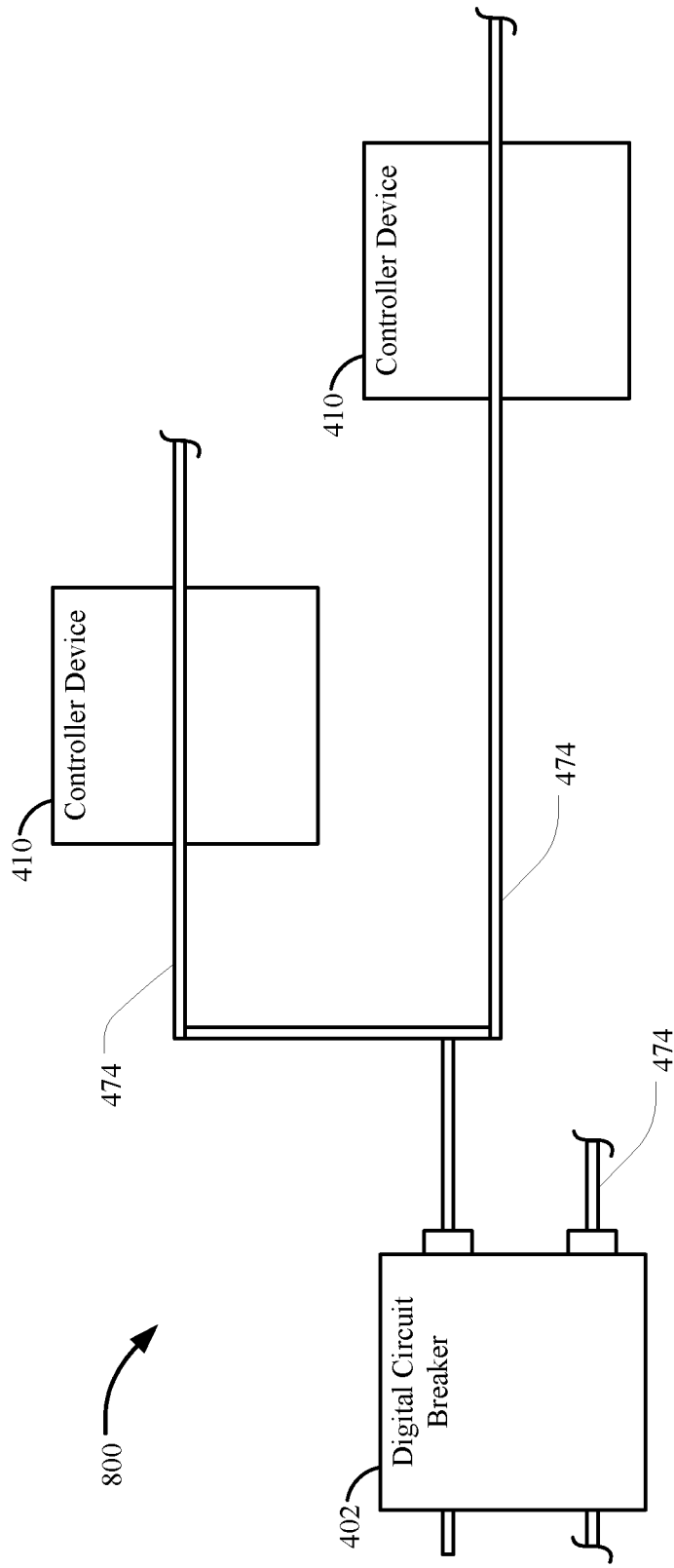
FIG. 12 shows a schematic illustration of yet another circuit breaker control system.

Additionally, in some embodiments, systems can include multiple controller devices 410. For example, FIG. 12 shows a circuit breaker control system 800, according to some embodiments, including the digital circuit breaker 402 and two controller devices 410 (although other numbers of controller devices 410 are possible) connected to multiple loads (e.g., multiple electric trace heaters 474). In some embodiments, multiple controller devices 410 can provide information for different locations along the same electric trace heaters 474, or along different electric trace heaters 474, as shown in FIG. 12. For example, multiple controller devices 410 can provide segmentation of electric trace heaters 474 and/or individual monitoring of parallel electric trace heaters 474, which can advantageously prevent the digital circuit breaker 402 from tripping by adjusting the time-current curve accordingly. More specifically, the multiple controller devices 410 can provide data to, or can instruct directly, the digital circuit breaker 402 to disrupt current provided to the electric trace heaters 474, based on the monitoring by the controller devices 410.

This can be advantageous in that, for example, when one of the controller devices 410 sense a GFLC event (e.g., the GFLC being above a threshold), the digital circuit breaker 402 can disrupt current provided to both electric trace heaters 474, even though only one of the controllers 410 may sense the GFLC event.

Furthermore, in some embodiments, a system 800 can include multiple digital circuit breakers and multiple controller devices, where each digital circuit breaker is associated with a corresponding controller device interfaced with the electric trace heater connected to the digital circuit breaker. In this case, respective electric trace heaters can be coupled to the component 168 at different locations to create respective heating zones. And the respective heating zones can be independently controlled with dedicated digital circuit breakers.

Figure 13:
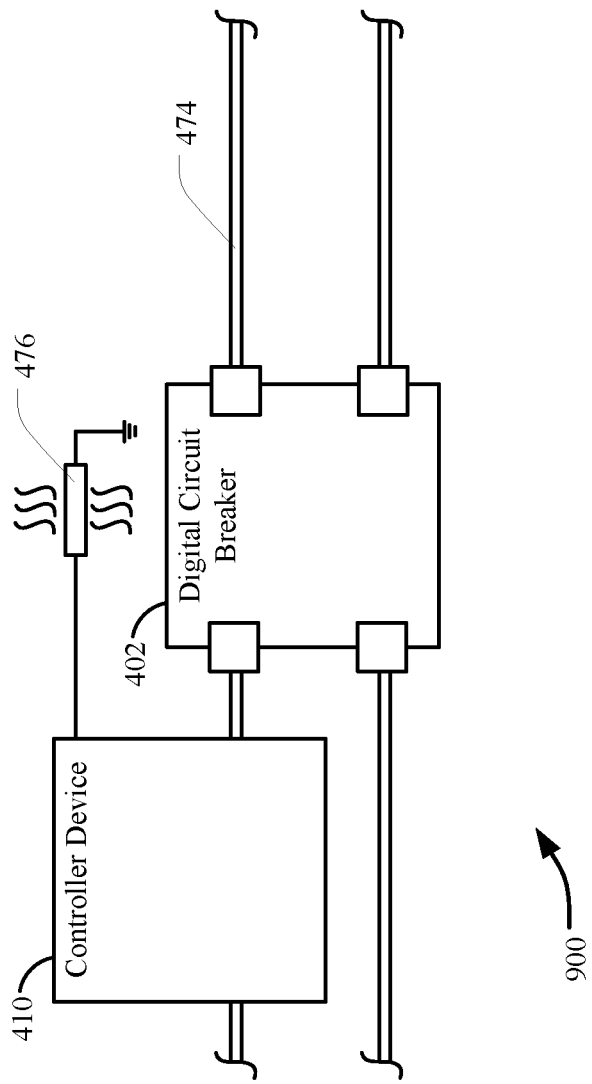
FIG. 13 shows a schematic illustration of yet another circuit breaker control system.

In some embodiments, temperature data can be used for adjusting time-current curves as well as for controlling operation of the digital circuit breaker 402. For example, FIG. 13 shows a circuit breaker control system 900, including the digital circuit breaker 402 having an electric trace heater 474, and a heating element(s) 476 interfaced with a controller device 410. In some embodiments, the digital circuit breaker 402 can be heated by the heating element 476, for example, when a sensed ambient temperature is lower than the operating temperature of the digital circuit breaker 402. In some configurations, heating elements 476 can be placed internally or externally to the housing of the digital circuit breaker 402. In some configurations, such as when the digital circuit breaker 402 includes the temperature sensors 454, based on the temperature sensor values exceeding a threshold (e.g., −40° Celsius or −10° C. in some embodiments) the digital circuit breaker 402 can cause the heating element 476 to turn on in order to raise the temperature of the digital circuit breaker 402 to or above an appropriate operating temperature. In some cases, the controller device 410 can control (and provide power to) multiple heating elements 476 that are disposed in the housing of the digital circuit breaker 402 (or the housing of the controller device 410, when the digital circuit breaker 402 is encapsulated by the controller device 410). In some configurations, with a sensor device 411 situated within the housing of the digital circuit breaker 402 (not shown in FIG. 13), the digital circuit breaker 402 can control and provide power to the heating elements 476.

Accordingly, in order to enable appropriate operation of digital circuit breakers placed in environments that are below operating temperatures, heating elements 476 can be used to heat the digital circuit breaker 402 to a temperature at or above a low temperature threshold (e.g., a low limit operation temperature of the digital circuit breaker). In other embodiments, other heating control systems (e.g., fans, heat exchangers, etc.) can be provided for the digital circuit breaker 402 so as to cool the digital circuit breaker 402 to temperatures below or at a high temperature threshold (e.g., a high limit operation temperature of the digital circuit breaker 402). Thus, in such embodiments, the digital circuit breaker 402 can operate effectively even when the ambient temperature is above or below the rated operating temperatures of the digital circuit breaker 402.

Figure 14:
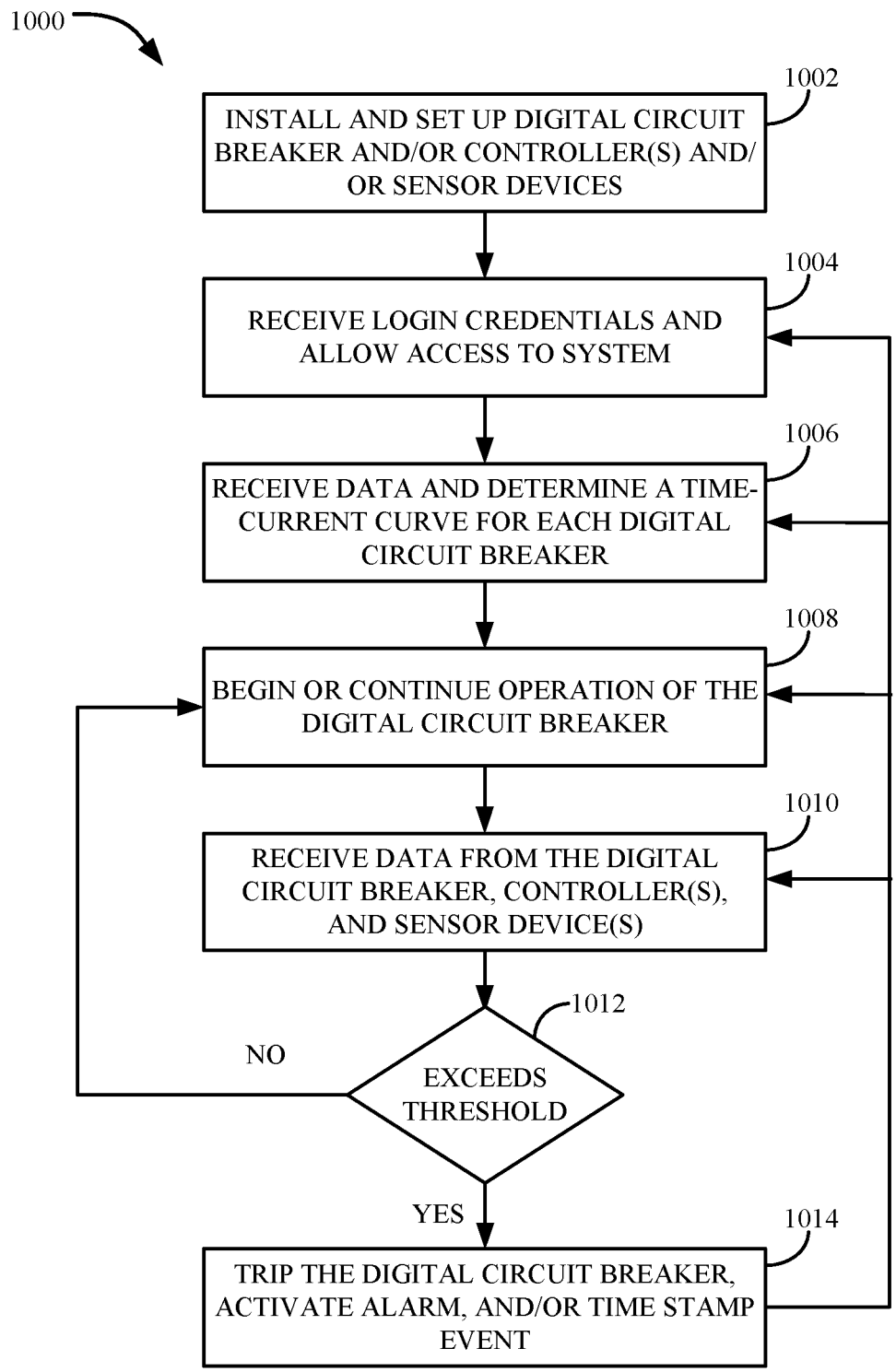
FIG. 14 shows a flowchart of a process for operating a circuit breaker control system.

FIG. 14 shows a flowchart of another process 1000 for operating a circuit breaker control system including a digital circuit breaker, which can be implemented using any of the previously described circuit breaker control systems. In addition, the process 1000 can be implemented using one or more computing devices, as appropriate (e.g., the computing device 404, the digital circuit breaker 402, and/or the controller device 410).

At step 1002, the process 1000 can include installing and setting up the digital circuit breakers, controller devices, sensor devices, electric trace heaters, sensor(s), etc. In some configurations, a user can install any number of digital circuit breakers, controller devices, sensor devices, electric trace heaters, sensor at various locations, and using various configurations.

At step 1004, the process 1000 can include a computing device receiving login credentials and allowing access to the system. For example, a system that monitors the performance of the circuit breaker control system (e.g., displayed on a computing device), can grant different levels of security for different conditions (e.g., monitoring, maintenance, adjustment in operation, etc.). Each level of security can be password protected, such that higher levels of security are needed for higher levels of influence to the system (e.g., viewing the information can be a fairly low security threshold).

At step 1006, the process 1000 can include a computing device receiving data and determining a time-current curve for each digital circuit breaker, similar to that described above with respect to steps 302, 304, 306 of the process 300. For example, in some cases, this can include transmitting operating parameters of the digital circuit breaker 402 so that one or more time-current curves can be generated, determined, modified, etc., by various user inputs. Additionally, in some cases, this can include transmitting data from controller devices 410 and/or sensor devices 411 so that one or more time-current curves can be generated or modified based on sensor values.

As a specific example, a temperature (e.g., ambient temperature or temperature of the component to be heated by the electric trace heaters, or a set point temperature of the component) can be monitored and used to determine a time-current curve. In particular, for relatively cold temperatures, portions of the time-current curve can be adjusted, such as shifted upwardly along an amplitude axis or otherwise modified (such as changing the shape via a linear function, exponents, sinusoids, polynomials, etc., to connect various points) based on a sensed ambient temperature. More specifically, in electric trace heater applications that operate in relatively cold temperatures, on start-up of the electric trace heater (e.g., as the electric trace heater first receives power) there may be large in-rush currents caused by the electric trace heater characteristics, that is, due to the cold temperature of the electric trace heater decreasing resistances of loads. For example, previous control systems would undesirably cause the digital circuit breakers to trip due to the higher start-up current (in-rush current) being above the previous control system threshold. However, by adjusting the time-current curve to factor in temperature for electric trace heaters during start-up, the digital circuit breaker 402 will exhibit less undesirable trips. This can be advantageous at least because these in-rush currents typically only appear for short periods of time until the electric trace heater heats up, such that the resistance increases. It is also contemplated the time-current curve can be adapted for relatively high ambient temperatures, as the relatively high ambient temperatures can decrease in-rush currents and, thus, portions of the time-current curve and be shifted downwardly along the amplitude axis, shifted upwardly at a lower rate, or not adjusted during start-up, as higher in-rush currents may not need to be accounted for in such temperature settings.

Once the unique time-current curve has been determined at step 1006, the digital circuit breaker can use the determined time-current curve to control power delivered to each electric trace heater, thus proceeding to step 1008.

However, in some cases, as described above, a temperature of the digital circuit breaker housing (or the controller device housing, or other components) can be obtained so as to ensure that the digital circuit breaker is operating in within a specified operating temperature range. For example, if the controller device 410 (or other suitable computing device) determines that the temperature of the digital circuit breaker 402 exceeds the desired operating temperature, the controller device 410 (or digital circuit breaker itself 402) can cause the digital circuit breaker 402 to trip until the operating temperature is reached. In other words, based on this determination, the process 1000 refrains from proceeding to step 1008, until the temperature of the digital circuit breaker 402 reaches a desired temperature (e.g., within a desired range). In some embodiments, based on this determination, the controller device 410 (or other suitable computing device) can activate a heating element (e.g., the heating element 476) or a suitable cooling device to provide heating or cooling to the digital circuit breaker 402, as described above.

Referring now to step 1008, the process 1000 can include a computing device beginning or continuing operation of the digital circuit breaker, similar to step 308 of the process 300. For example, a signal from the solid state switch and/or sensors can indicate the circuit is open, or closed, along with data regarding previous operation of the solid state switch and the actuator mechanism.

At step 1010, the process 1000 includes the digital circuit breaker 402 receiving data from the various sensors (e.g., from the control device 410, the sensor devices 411, etc.). For example, temperatures and other sensor values can be updated periodically. In some embodiments, the controller device 410 can receive sensor values sensed by internal sensors, the sensor devices 411, etc., as well as parameters sensed by the digital circuit breaker 402, such as the voltage, the current, the apparent power (e.g., kilovolt-amps), the real power (e.g., kilowatts), the power factor, etc. For example, the processor of the digital circuit breaker can monitor elapsed time and current (or voltage values) from the sensors. Then, the processor of the digital circuit breaker 402 can determine present time-current information from the sensors, elapsed time, etc., and, if necessary, other calculations described above, such as averaging, integrating, etc. In some embodiments, the controller 410 can also receive a GFLC value from a GFLC sensor.

At 1012, process 1000 can include a computing device determining whether or not the present time-current information exceeds the determined time-current curve (e.g., acting as the threshold), similar to step 310 of the process 300. For example, if the present time-current information does not exceed the threshold, the process 1000 can proceed back at 1008, continuing operation of the electric tracer heaters. Additionally, in some embodiments, the process 1000 can periodically revert back to step 1006, rather than step 1008, to confirm or update the time-current curve. On the other hand, when the computing device determines that the present time-current information exceeds the threshold at step 1012, the process 1000 can proceed to 1014. Additionally, at 1012, the computing device can compare a GFLC threshold with the GFLC value from the GFLC sensor. Based on the determination that the GFLC value exceeded the GFLC threshold, indicating a GFLC event, the process 1000 can proceed to 1014.

At 1014, the process 1000 can include the digital circuit breaker disrupting current provided to the electric trace heater(s). In some cases, this can include activating the solid state switch, activating the actuator device, or both, to disrupt current provided to the electric trace heater(s). In some embodiments, the disruption of current provided to the electric trace heater can be included with the actuating of a button indicating a tripping event, an initiation of an alarm (e.g., transmitting an alarm, such as a notification, to the computing device 204), displaying a visual alarm on the digital circuit breaker, initiating an audible alarm, such as on the computing device 204, etc. In some embodiments, once the tripping event has been analyzed and the problem fixed, the digital circuit breaker can be reset and can continue operating, such as at step 1004, 1006, 1008, or 1010.

In some embodiments, process 1000, such as at step 1010, can further include determining a present health score of an electric trace heater, as described above with respect to FIG. 11. In some embodiments, the present health score of the electric trace heater can be compared to a threshold health score, for example, at step 1012. If the present health score of the electric trace heater exceeds the threshold health score, the process 1000 can proceed to step 1014, i.e., the digital circuit breaker can trip and an alert can be transmitted to a suitable computing device indicating that the electric trace heater should be replaced or serviced.

It should be understood that the above-described steps of the processes of FIG. 6 and FIG. 14 can be executed or performed in any order or sequence not limited to the order and sequence shown and described in the figures. Also, some of the above steps of the process of FIG. 6 and FIG. 14 can be executed or performed substantially simultaneously where appropriate.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

The invention claimed is:

1. A control system for a digital circuit breaker, the system comprising:
   a digital circuit breaker;
   an electric trace heater electrically connected to the digital circuit breaker, wherein the digital circuit breaker is to disrupt current provided to the electric trace heater based on a time-current curve;
   a temperature sensor; and
   a controller device in communication with the digital circuit breaker and the electric trace heater, the controller device including:
     a processor in communication with the temperature sensor, the processor being configured to:
       receive a temperature value from the temperature sensor,
       construct the time-current curve for the digital circuit breaker based on the temperature value,
       transmit data representative of the constructed time-current curve to the digital circuit breaker,
       receive a new temperature value from the temperature sensor,
       construct a new time-current curve for the digital circuit breaker based on the new temperature value, and
       transmit new data representative of the new constructed time-current curve to the digital circuit breaker.

2. The system of claim 1, wherein the controller device is positioned within a housing of the digital circuit breaker.

3. The system of claim 1, wherein the digital circuit breaker is positioned within a housing of the controller device.

4. The system of claim 1, further comprising a heating element, and the processor being further configured to:
   receive a temperature value from the temperature sensor; and
   activate the heating element, based on the temperature value exceeding a threshold value.

5. The system of claim 1, further comprising a sensor device having a sensor, the sensor device in wireless communication with the controller device, the sensor device configured to receive sensor data from the sensor and transmit the sensor data to the controller device.

6. The system of claim 5, wherein the electric trace heater is coupled to a component to be heated,
   wherein the sensor device is a second temperature sensor in thermal communication with at least one of the electric trace heater, and the component to be heated.

7. The system of claim 6, wherein the processor is further configured to determine a health score of the electric trace heater based on a sensor value.

8. The system of claim 7, wherein the processor is further configured to determine the health score of the electric trace heater, based on at least one of the temperature value, a current value, a voltage value, power factor value, a signal from a ground fault leakage current sensor, and combinations thereof.

9. The system of claim 1 and further comprising a ground fault leakage current sensor, wherein the processor is further configured to:
   receive a ground fault leakage current value from the ground fault leakage current sensor, and
   cause the digital circuit breaker to disrupt current provided to the electric trace heater, based on the ground fault leakage current value.

10. The system of claim 1, wherein the time-current curve includes at least one of:
    a long trip threshold having a long trip time;
    a short trip threshold having a short trip time; and
    an instantaneous trip threshold having an instantaneous trip time.

11. The system of claim 1, wherein the processor is further configured to construct the time-current curve based on a circuit length at a given startup temperature of the electric trace heater.

* * * * *